United States Patent
Matzkel

(10) Patent No.: US 9,369,281 B2
(45) Date of Patent: Jun. 14, 2016

(54) METHOD AND SYSTEM FOR SECURE USE OF SERVICES BY UNTRUSTED STORAGE PROVIDERS

(75) Inventor: Ben Matzkel, Givataim (IL)

(73) Assignee: Vaultive Ltd., Tel-Aviv (IL)

( * ) Notice: Subject to any disclaimer, the term of this patent is extended or adjusted under 35 U.S.C. 154(b) by 79 days.

(21) Appl. No.: 13/063,939

(22) PCT Filed: Sep. 15, 2009

(86) PCT No.: PCT/IL2009/000901
§ 371 (c)(1),
(2), (4) Date: Mar. 15, 2011

(87) PCT Pub. No.: WO2010/029559
PCT Pub. Date: Mar. 18, 2010

(65) Prior Publication Data
US 2011/0173438 A1    Jul. 14, 2011

Related U.S. Application Data

(60) Provisional application No. 61/096,891, filed on Sep. 15, 2008.

(51) Int. Cl.
*H04L 9/14* (2006.01)
*H04L 9/08* (2006.01)
*H04L 9/32* (2006.01)

(52) U.S. Cl.
CPC ............... *H04L 9/14* (2013.01); *H04L 9/0833* (2013.01); *H04L 9/321* (2013.01); *H04L 2209/60* (2013.01); *H04L 2209/76* (2013.01)

(58) Field of Classification Search
None
See application file for complete search history.

(56) References Cited

U.S. PATENT DOCUMENTS

| | | | |
|---|---|---|---|
| 6,961,849 B1 | 11/2005 | Davis et al. | |
| 7,580,980 B2 * | 8/2009 | Kawashima et al. | 709/206 |
| 7,895,666 B1 * | 2/2011 | Eshghi et al. | 726/30 |
| 2001/0037454 A1 * | 11/2001 | Botti et al. | 713/176 |
| 2003/0081784 A1 * | 5/2003 | Kallahalla et al. | 380/277 |
| 2006/0005017 A1 | 1/2006 | Black et al. | |
| 2006/0101285 A1 * | 5/2006 | Chen et al. | 713/193 |
| 2006/0143237 A1 | 6/2006 | Peterson et al. | |
| 2007/0100913 A1 * | 5/2007 | Sumner et al. | 707/204 |
| 2007/0234034 A1 * | 10/2007 | Leone et al. | 713/150 |

FOREIGN PATENT DOCUMENTS

WO    WO 2010/029559    3/2010

OTHER PUBLICATIONS

International Preliminary Report on Patentability Dated Mar. 24, 2011 From the International Bureau of WIPO Re.: Application No. PCT/IL09/00901.

(Continued)

*Primary Examiner* — David Le

(57) ABSTRACT

A method for encrypting data. The method comprises receiving, from a user, via a client terminal, digital content including at least one textual string for filling in at least one field in a document managed by a network node via a computer network, encrypting the at least one textual string, and sending the at least one encrypted textual string to the network node via the computer network so as to allow filling in the at least one field with the at least one encrypted textual string. The network node is configured for storing and retrieving the at least one textual encrypted string without decrypting.

42 Claims, 14 Drawing Sheets

(56) References Cited

OTHER PUBLICATIONS

International Search Report and the Written Opinion Dated Jan. 14, 2010 From the US Patent and Trademark Office Re.: Application No. PCT/IL09/00901.
Office Action Dated Sep. 14, 2014 From the Israel Patent Office Re. Application No. 211750.
Supplementary European Search Report and the European Search Opinion Dated Dec. 10, 2013 From the European Patent Office Re. Application No. 09812787.1.
Menezes et al. "Key Management Techniques", Handbook of Applied Cryptography, XP002716554, Chap. 13: 546-552, 1997.

* cited by examiner

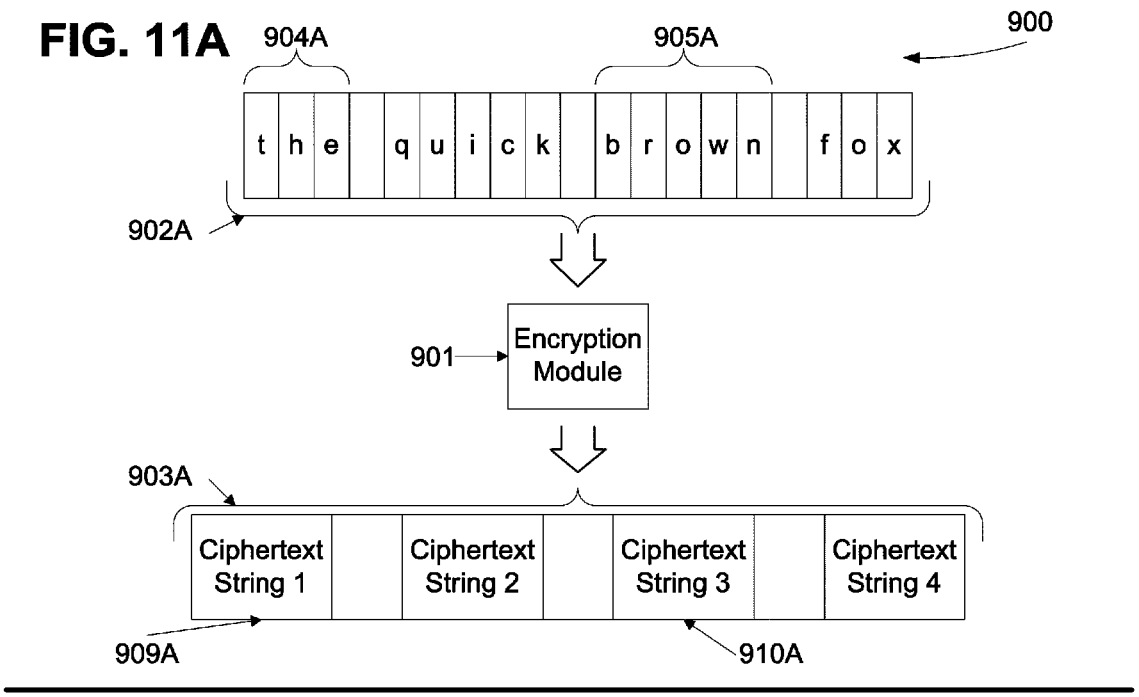
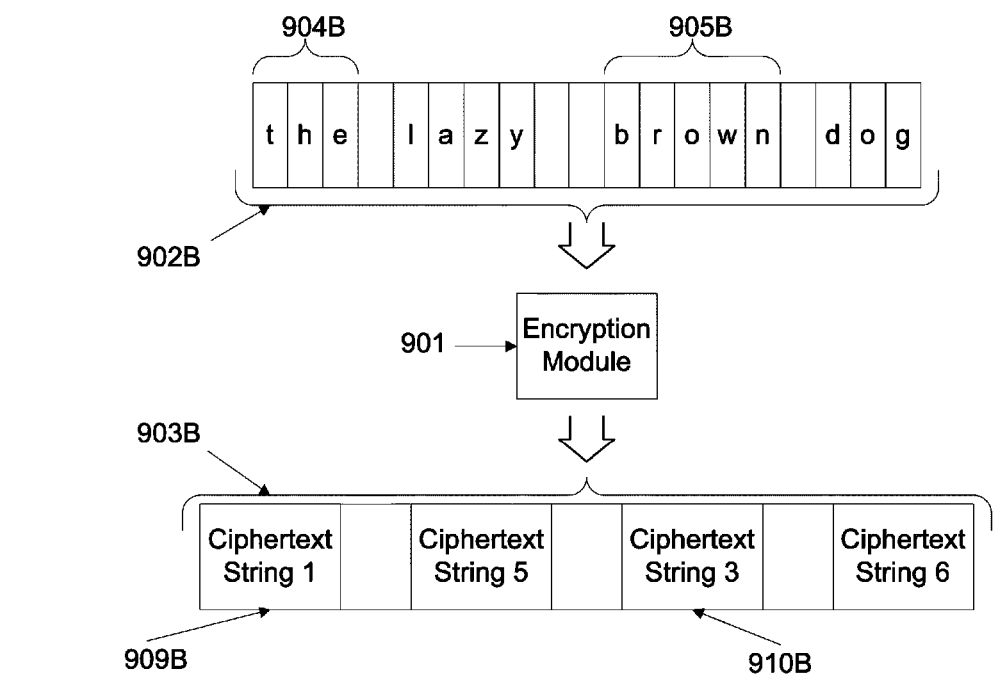

METHOD AND SYSTEM FOR SECURE USE OF SERVICES BY UNTRUSTED STORAGE PROVIDERS

RELATED APPLICATIONS

This application is a National Phase of PCT Patent Application No. PCT/IL2009/000901 having International filing date of Sep. 15, 2009, which claims the benefit of priority of U.S. Provisional Patent Application No. 61/096,891 filed on Sep. 15, 2008. The contents of the above applications are all incorporated herein by reference.

FIELD AND BACKGROUND OF THE INVENTION

The present invention, in some embodiments thereof, relates to a system and a method for encryption and decryption and, more particularly, but not exclusively, to a system and a method for encryption and decryption of digital data transmitted over a communication network.

The Internet and the World Wide Web allow companies and organizations to offer services in a document, such as a digital form of web applications, to businesses and individuals who may access and utilize these services with a personal computer and a web browser. Some examples of those applications are electronic mail, instant messaging, productivity tools, customer relationship management, enterprise resource planning, human resources applications, blogs, and social networking sites.

This model has inherent security risks. User data, such as messages, customer records, and company financials, are stored on remote servers beyond the control of the provider of the user data. Storing personal or corporate information on remote servers exposes the data owner to many risks, and implies that the information's owner must trust the entity that owns the computer systems hosting the information and the network connecting the information owner and the hosting systems.

For instance, commonly known accounting software solutions require its customers to post accounting information that is stored on the solution provider's servers. In such systems, the customer has to entrust the solution provider with the accounting information and lose control over the privacy and integrity thereof.

Known applications utilize a variety of encryption schemes to render data unintelligible to anyone who does not possess the appropriate decryption methods or keys. Hosted applications may require that certain information be unencrypted while the encryption of other information will not affect the application. Application providers may enable and/or require an information owner to encrypt data in transit between a client and a host using secure socket layer (SSL) encryption or another method. This prevents an internet service provider (ISP) and other potential eavesdroppers from seeing the data itself. The data is decrypted upon arrival to the hosted application, and the hosted application vendor can still see the owner's data. Some methods currently exist for partial data encryption, but the level of granularity provided by these methods is insufficient to simultaneously meet the requirements of multiple generic hosted applications.

For example, U.S. Pat. No. 7,165,175, filed on Sep. 6, 2000 describes an apparatus and method for selectively encrypting portions of data sent over a network between client and server. The apparatus includes parsing means for separating a first portion of the data from a second portion of the data, encrypting means for encrypting only of the first portion of the data, and combining means for combining the encrypted first portion of the data with the second portion of the data. The apparatus further includes decrypting means installed at the client for decrypting the encrypted portion of the data. WIPO Patent Number WO 01/47205 A2, filed on Nov. 9, 2000 enhanced computer network encryption using downloaded software objects. This application describes a method and a system for securing highly sensitive financial and other data contained in transmissions over a public network, such as the World Wide Web, linking a web server computer to a remote client computer. By determining a desired (usually strong) specific standard of encryption for all sensitive communications between web server and client, and "pushing" the capability to encrypt to such standard to the client by automatically downloading from the web server to the client, and executing within the client's web browser, software objects to perform encryption/decryption tasks pursuant to the chosen standard, strong encryption is readily assured even if the client did not originally have such strong encryption capabilities.

SUMMARY OF THE INVENTION

According to some embodiments of the present invention there is provided a method for encrypting data, including a) using a client terminal for accessing at least one field in a document managed by a network node via a computer network, b) receiving, from a user, digital content including at least one textual string for filling in the at least one field, c) using the client terminal for encrypting the at least one textual string, and d) allowing the client terminal to send the at least one encrypted textual string to the network node via the computer network to allow the filling in, wherein the network node is configured for storing and retrieving the at least one textual encrypted string without decrypting.

Optionally, the at least one textual string is part of a plurality of textual strings, the encrypting includes identifying each the textual string as a separate content unit and separately encrypting each one of the at least one textual string.

Optionally, the network node is configured to allow at least one additional client terminal to acquire the at least one encrypted textual string, further including allowing the additional client terminal to decrypt the encrypted textual string at each the at least one additional client.

Optionally, the using includes acquiring at least one encrypting key from a repository including a plurality of cryptographic keys, the encrypting being performed using the at least one encrypting key, the allowing including allowing at least one additional client terminal to acquire at least one respective decrypting key from the repository.

Optionally, the receiving, from a user, digital content including at least one textual string for filling in the at least one field is performed by the client terminal.

Optionally, the encrypting includes acquiring a respective encrypting key from a key database via the computer network.

Optionally, the method further includes authenticating the user before the using the client terminal for encrypting the at least one textual string.

Optionally, the separately encrypting includes converting the at least one textual string to at least one respective binary ciphertext string, and converting each the respective binary ciphertext to an alphanumeric ciphertext.

Optionally, the separately encrypting including adding an identifier to each separately encrypted string, further including allowing a recipient to use each identifier for processing each respective separately encrypted string.

Optionally, the at least one field is designated for storing unencrypted data.

Optionally, the document having a plurality of fields, the using of using a client terminal for accessing at least one field in a document managed by a network node via a computer network including allowing the user to indicate the at least one field from the plurality of fields.

Optionally, the digital content including a plurality of textual strings, and the using of the client terminal for encrypting the at least one textual string includes allowing the user to indicate the at least one textual strings from a plurality of textual strings.

Optionally, the method further includes e) creating an index of the at least one separately encrypted textual string, f) receiving a search query having the at least one textual string, and g) extracting the at least one separately encrypted textual string from the search query. The extracting allows using the at least one separately encrypted textual string for responding the search query.

Optionally, the document includes a plurality of fields, further including presenting the digital form to allow the user to select the at least one field from the plurality of fields before the using a client terminal for accessing at least one field in a document managed by a network node via a computer network.

Optionally, the encrypting further including adding error validation information to each one of the at least one separately encrypted textual strings, thereby allowing a reliability validation during a decrypting thereof.

Optionally, the network node informs the client terminal whether to perform the using the client terminal for encrypting the at least one textual string.

Optionally, the document includes a plurality of fields, selecting the at least one field from the plurality of fields according to statistical usage data related to the document.

Optionally, the document is a file attachment and/or any other uploaded file.

According to some embodiments of the present invention, there is provided a system for managing encryption of digital content, including a repository including a plurality of cryptographic keys each associated with a group of users, and a managing unit configured for accessing the repository and providing each the cryptographic key to at least first and second members of a respective the group, wherein the provided cryptographic key is configured for allowing the first member to separately encrypt at least one string of a message forwarded over a computer network to a network node and the second member to separately decrypt the at least one encrypted string, the network node being configured for storing and retrieving the at least one textual encrypted string without decrypting.

Optionally, the message is forwarded to a network node, the second member being configured for acquiring the at least one encrypted string from the network node.

Optionally, the message includes a data designated for filling in at least one field of a document, the network node being configured for managing the digital form.

Optionally, the digital form is a data sheet of a data management system.

Optionally, the message is an email message, the network node and the managing unit being connected to a computer communication network.

Optionally, the message is a cellular message, the network node and the managing unit being connected to a cellular communication network.

Optionally, the message is an instant messaging (IM) message, the network node and the managing unit being connected to a computer network.

According to some embodiments of the present invention there is provided a system for managing encryption of digital content, including managing unit configured managing a plurality of cryptographic keys each associated with a group of users, plurality of cryptographic modules installed in a plurality of client terminals and configured for allowing a first member of the group to encrypt at least one string using a respective the cryptographic key and uploading the at least one encrypted string to a remote network node, wherein at least one of the plurality of cryptographic modules is configured for allowing a second member of the group to decrypt the at least one uploaded encrypted string using the respective cryptographic key, the remote network node being configured for storing and retrieving the at least one textual encrypted string without decrypting.

According to some embodiments of the present invention there is provided a client terminal configured for encrypting data, including a port configured for allowing a application to access, via a computer network, at least one field managed by a network node, an input module configured for receiving, from a user, digital content including at least one textual string for filling in the at least one field, an encrypting module configured for encrypting the at least one textual string, and an output module configured for sending the at least one encrypted textual string to the network node via the computer network to allow the filling in.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 11A and 11B are sample illustrations of parsing strings of text by the encryption module, according to some embodiments of the present invention;

DESCRIPTION OF SPECIFIC EMBODIMENTS OF THE INVENTION

Figure 1:
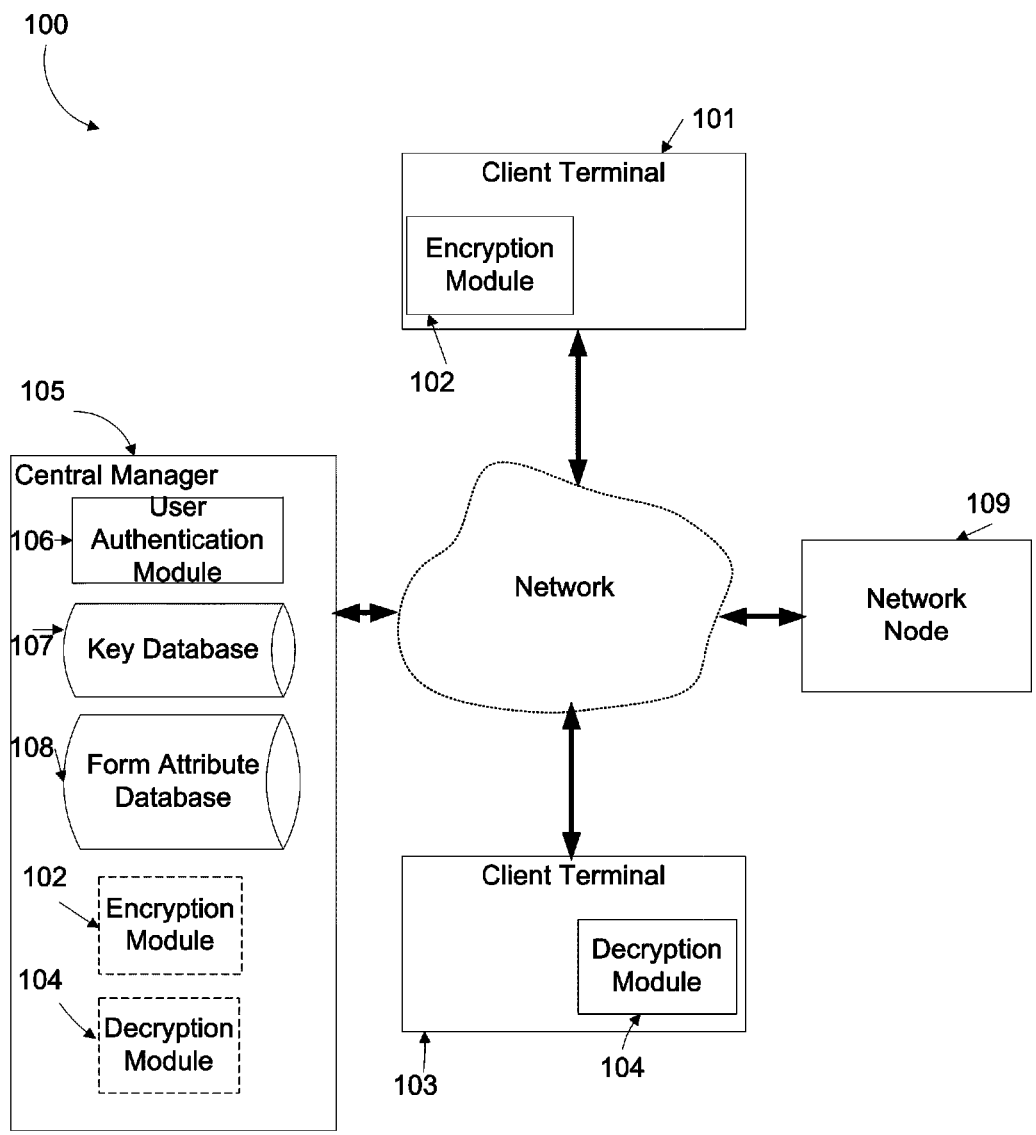
FIG. 1 is a simplified block diagram illustrating elements of a system for encrypting data and non-specific data flow between the elements, according to some embodiments of the present invention.

The present invention, in some embodiments thereof, relates to a system and a method for encryption and decryption and, more particularly, but not exclusively, to a system and a method for encryption and decryption of digital data transmitted over a communication network.

According to some embodiments of the present invention, a system and method of encrypting and decrypting data transmitted across a network and stored on a network node, such as a server beyond the control of a user. The system employs cryptographic techniques at a highly granular level in conjunction with applications and on-demand services via public and/or private networks. In such embodiments, a user may derive the benefits of those services while retaining a high level of information privacy.

According to some embodiments of the present invention, digital content posted to a network node by a client terminal is encrypted before the posting in a manner that does not impair the business logic implemented by the network node. The system performs encryption of discrete textual character strings, which may be referred to as content units, in the digital content prior to transmitting them to the network node. The network node stores and/or operates on the encrypted digital content as it would on unencrypted digital content while the digital content itself may be unintelligible to the network node and to its operator. When encrypted digital content is sent from the network node to a client terminal properly equipped with the invention, the digital content is decrypted so it may be viewed and/or used by a user that utilizes the client terminal for accessing data managed or stored by the network node. Both the encryption and decryption processes are undetectable to the network node, and in some embodiments to the user.

In some embodiments of the present invention, a user of a client terminal may be required to authenticate the user's identity as an authorized user of the system before a central manager makes available encryption keys and/or decryption keys and/or other configuration information necessary to the user.

The following terms are herewith defined for subsequent use:

A user: a human that interacts with a computer system via an interface, or an automated device that interacts with a computer system via an interface in a manner that mimics human behavior.

A client terminal: a device comprised of hardware and/or software and/or firmware that acts as an interface between a computer network and a human or between a computer network and an automated device. As used herein a client terminal means a personal computer connected to a computer network, a mainframe computer terminal emulator, a personal digital assistant (PDA), and a cellular telephone.

A client terminal display: a component of a client terminal that presents information to a human or to an automated device.

A field: an area with associated attributes such as type and/or length which is presented on the client terminal display, for example for the purpose of accepting user input, or a data element of a record of a database.

A form: a collection of fields, such as a webpage and/or a set of records which are designed to be presented and/or edited simultaneously or sequentially.

A network node: one or more client terminals which are connected to a communication network, such as the internet, or any hardware, software, and/or firmware, which are connected to and/or addressable by a network.

A cryptographic key: a piece of information that determines the functional output of a cryptographic algorithm; an encryption and/or a decryption key. An encryption key specifies the particular transformation of plaintext into ciphertext; a decryption key specifies the particular transformation of ciphertext into plaintext.

A textual character: one or more characters representing a number, a letter, an alphanumeric character, and/or a symbol in any language.

A textual string: a string of one or more textual characters.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Reference is now made to FIG. 1 that illustrates elements of the system 100, according to some embodiments of the present invention. The system is based on one or more client terminals, such as shown at 101, each hosting an encryption module 102 and one or more client terminals 103 each hosting a decryption module 104.

The client terminals 101, 103 are connected to the network node 109 that may store and/or manage data received from the client terminal 101, and may retrieve data from and data transmit to the client terminal 103. The network node 109 may host an application and/or a service which is available to the users of the client terminals 101, 103. According to some embodiments of the invention, examples of users accessing applications and/or services on network nodes include a user writing a blog via the Internet, a user preparing income tax forms via the Internet, a user sending email through an email provider such as Yahoo™ Mail or Hotmail™, and a user computer program sending email through a email exchange server. The central manager 105 may comprise a user authentication module 106, a key database 107, and/or a form attribute database 108. The user authentication module 106 may verify client terminal authorization to receive information from the central manager 105. The key database 107 may contain encryption and/or decryption keys. The digital form attribute database 108 may contain attributes associated with identifiable forms that may reside on the network node 109.

In some embodiments of the present invention, the encryption module 102 allows a user to encrypt digital content which is posted using a web browser which is installed thereon.

In some embodiments of the present invention, the encryption module 102 allows a user to encrypt digital content which is posted using instant message (IM) service, such as, AIM™, MSN Messenger™, Yahoo IM™, and Google Talk™ which is installed on the client terminal 101. Optionally, the user may select messages for encryption by clicking on a screen toolbar button. Optionally, the user selects messages for encryption by setting a configuration option selection.

In some embodiments of the present invention, the client terminal 103 is a cellular phone and the network node 109 is a short message service (SMS) and/or a multimedia messaging service (MMS) gateway and/or server. In such an embodiment, the encryption module 102 allows a user to encrypt digital content which is posted in an SMS and/or an MMS message. In such an embodiment, the encryption module 102 is installed on the cellular phone and may be configured to encrypt messages, optionally selected, before the sending thereof. In such an embodiment, the encryption module 102 may be used to provide the addressee of the message with a respective encryption key and/or decryption key via an additional SMS message. Such a key will allow the addressee to decrypt messages from the sender and/or to encrypt messages which are designed to her in a manner that can be decrypted by her.

The network node 109 may be a server or a unit managed by any storage and/or service provider. In such a manner, digital content that is uploaded to and managed and/or processed by a third party, such as a communication service provider, is encrypted by the system 100. The system 100 provides an additional security layer that is not controlled by the storage and/or service providers. The additional security layer allows the user to use the services of the service and/or storage provider without exposing the uploaded data and/or losing the control thereon. As the storage and/or service providers cannot use the encrypted digital data without decrypting it, the user is not exposed to acts of privacy invasion, unauthorized data analysis and/or unauthorized usage. Furthermore, the system 100 protects the content from security attacks which may be held against the hosting network node 109.

In some embodiments of the present invention, the encryption module 102 and/or the decryption module 104 work in conjunction with an application such as a web browser or an instant messenger. The encryption module 102 and/or the decryption module 104 intercept and process only data being sent and/or received by that application.

In some embodiments of the present invention, the encryption module 102 and/or the decryption module 104 intercept and examine all data transmitted to and/or from the network by all applications on the client terminal 101, 103. Automatic encryption and/or decryption processing takes place in the client terminal network interface. Optionally, the encryption module 102 and/or the decryption module 104 processes data from all applications such as a web browser, an instant messenger, and other installed applications that communicate with network nodes. Optionally, a port comprises the encryption module 102 and/or the decryption module.

Figure 13:
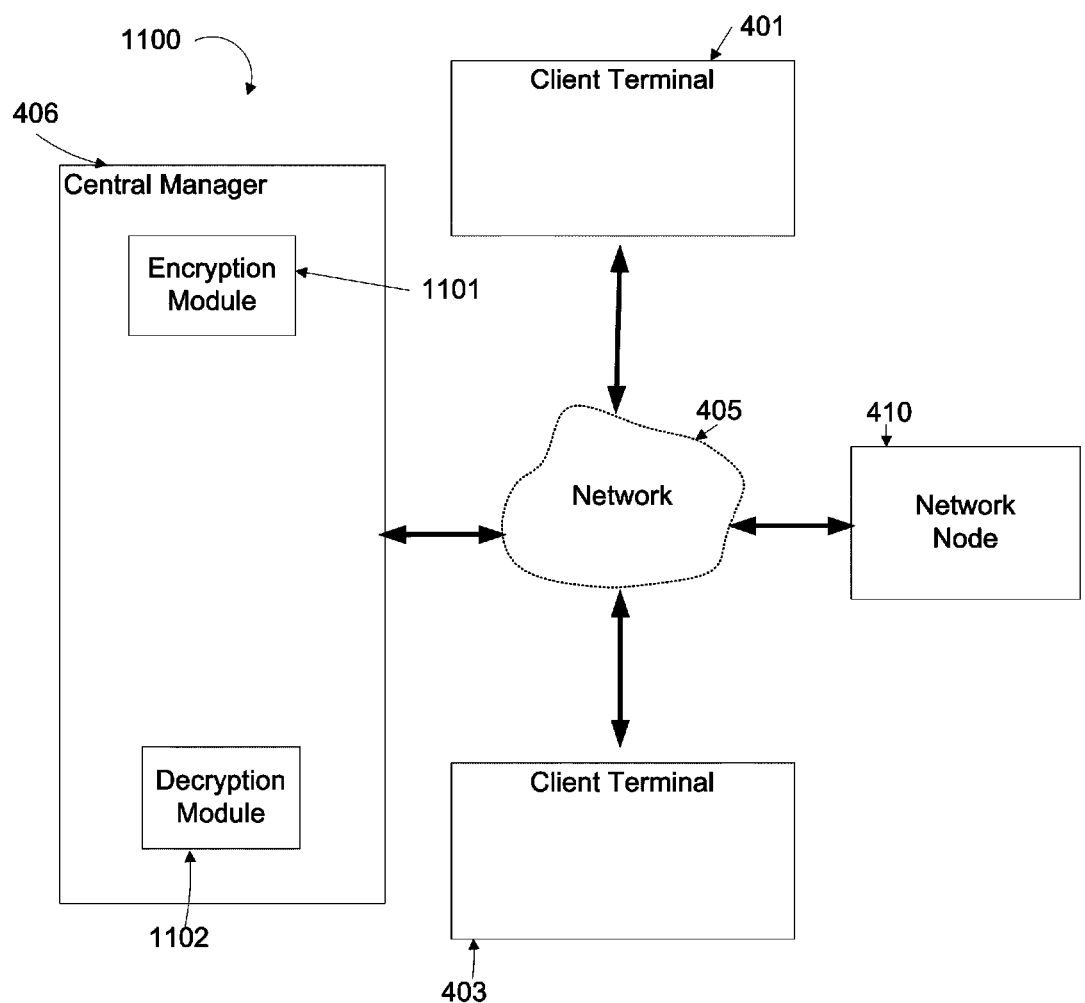
FIG. 13 is a simplified block diagram illustrating elements of a system for encrypting data and a non-specific data flow in which encryption and/or decryption is performed by a network server, according to some embodiments of the present invention.
Figure 14:
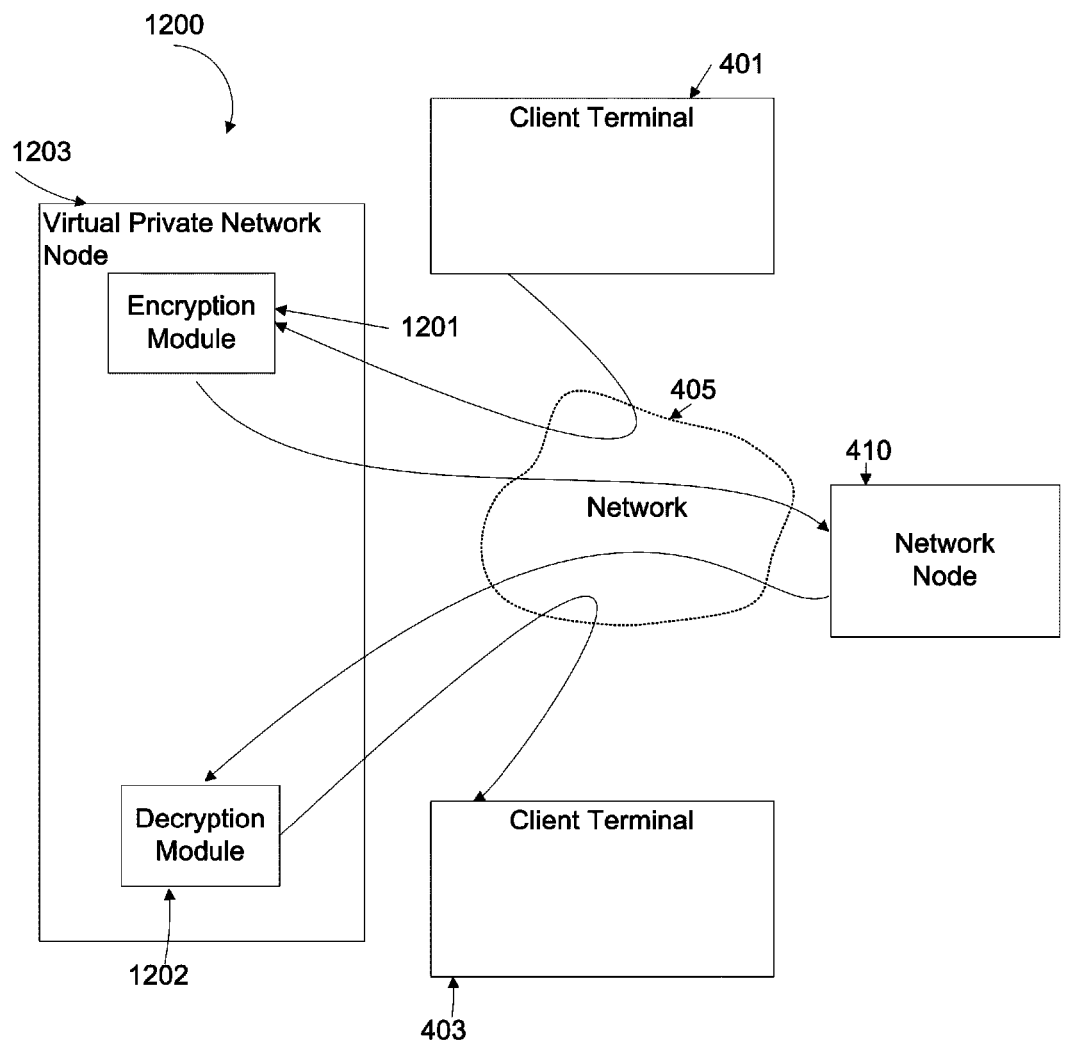
FIG. 14 is a simplified block diagram illustrating elements of a system for encrypting data and a non-specific data flow between nodes of a virtual private network (VPN) and/or using a proxy network node, according to some embodiments of the present invention.

It should be noted that though the encryption module 102 and the decryption module 104 are depicted as part of the client terminals 101, 103, they may be installed on the central manager 105, as shown by the dashed lines. In such an embodiment, digital content, such as a text segment including one or more text strings, such as words, numbers, and the like is forwarded for encryption by the encryption module 102 and afterwards for decryption by the decryption module 104 which may be installed in central manager 105, or on any other network node that is connected to the network. In such an embodiment, the central manager 105 may function as a proxy or any server that is located between a client terminals and the network node 109. For brevity, any reference to an encryption module and/or a decryption module which are installed on the client terminals 101 103 may be respectively made to encryption and/or decryption modules which are installed on the central manger 105. Such exemplary architecture is depicted in FIGS. 13 and 14.

Figure 2:
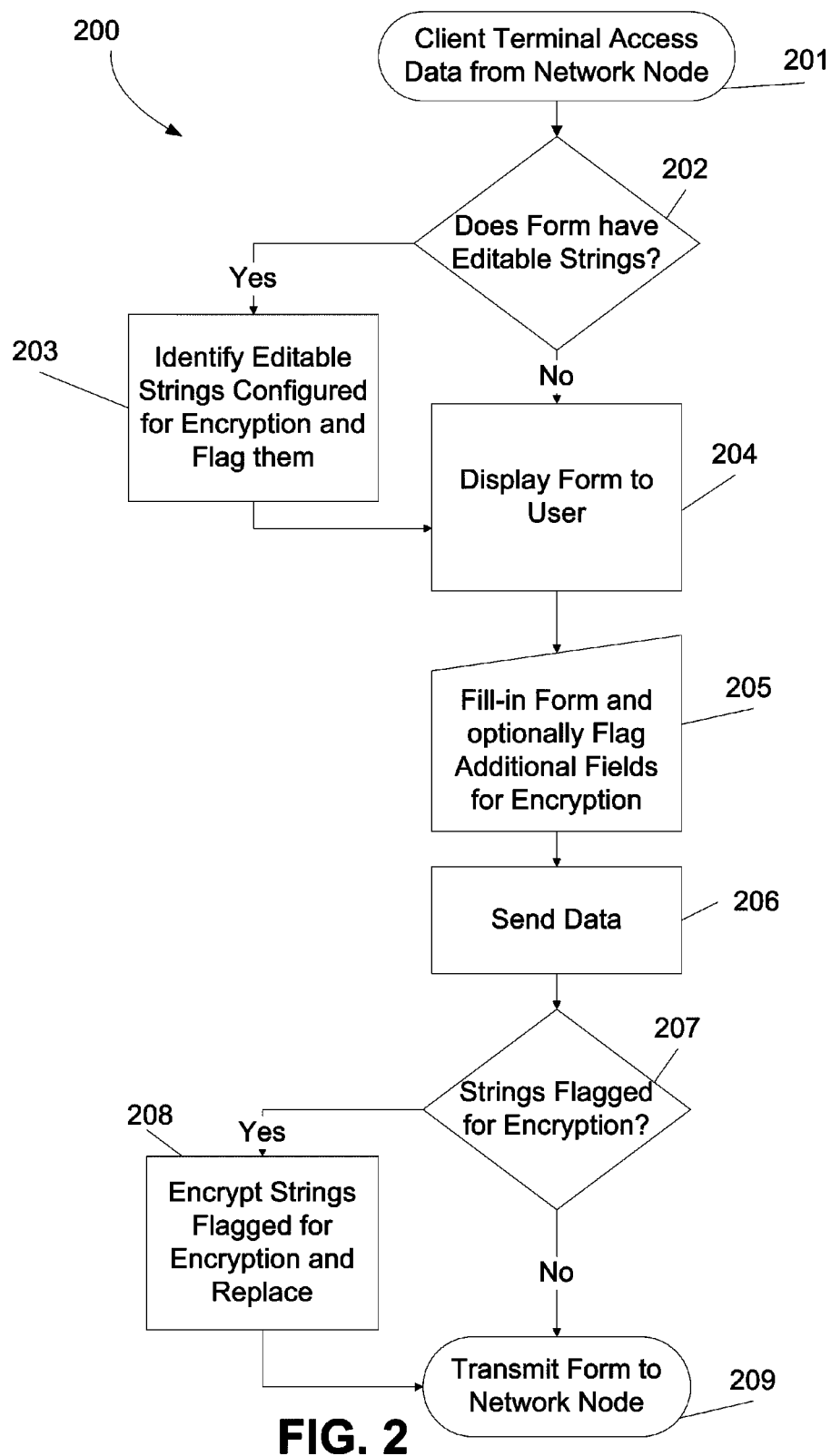
FIG. 2 is a flowchart of a method for encrypting data, according to some embodiments of the present invention.

Reference is now also made to FIG. 2, which is a flowchart 200 of a method 200 for encrypting data, according to some embodiments of the present invention. First, as shown at 201, the client terminal 101 accesses a document, such as a digital form, for example a webpage with fields, such as text boxes, list boxes, scroll bars, combo-boxes, dialog boxes, editable windows, which is hosted on and/or managed by the network node 109, such as a server, a personal computer, a mainframe computer, a bulletin board system (BBS), and/or any other digital content management unit which is available via the network. The document, which may be referred to herein as a digital form, includes one or more fields which are designed to be filled in with one or more textual strings and/or for allowing the user to select one or more textual strings or symbols. For brevity, filling in a field means filling in textual strings and selecting textual strings from a plurality of optional textual strings. For example, fields may be used for allowing the user to input digital content, such as correspondence, a name, a password, a social security number, and/or an address. The encryption module flags editable fields configured for string encryption 203 and client terminal display the accessed data 204. In use, the user fills-in editable fields and optionally flags more fields for string encryption 205. Optionally, the editable fields have been filled in by the user, the user instruct the encryption module 102, for example by using a graphical user interface (GUI), such as a button in a toolbar, to encrypt the data that is filled in one or more of the editable fields. Then, the encryption module 102 may examine the filled in data and/or the flags to determine whether a string in any fields should be encrypted 207 or not. As shown in 208, the encryption module examines textual data in fields flagged for encryption and separately encrypts strings in each field, and as shown in 209, the client terminal transmits the resulting data the network node. The encryption, which is performed by the encryption module 102, is optionally based on a cryptographic key which is made available to one or more recipients. In such a manner, the user and the recipients may decrypt and process the encrypted the strings without exposing the digital content thereof to third parties, such as the network node that manages the digital form and/or the repository in which the encrypted strings are stored. Optionally, the user and the recipients are part of a group of users, such as a group of members of a certain organization, a group of friends, a group of service subscribers and the like.

In some embodiments of the present invention, the encryption module 102 may be used for encrypting non textual media content which may be uploaded by the user. In such an embodiment the user may use the encryption module 102 to encrypt, optionally according to the same encrypting key which is used for encrypting strings, visual content, such as pictures, for example joint photographic experts group (JPEG) files, and video files, for example moving picture experts group (MPEG), audible content, such as audio files, for example MPEG-1 audio layer-3 (MP3) files.

Figure 3:
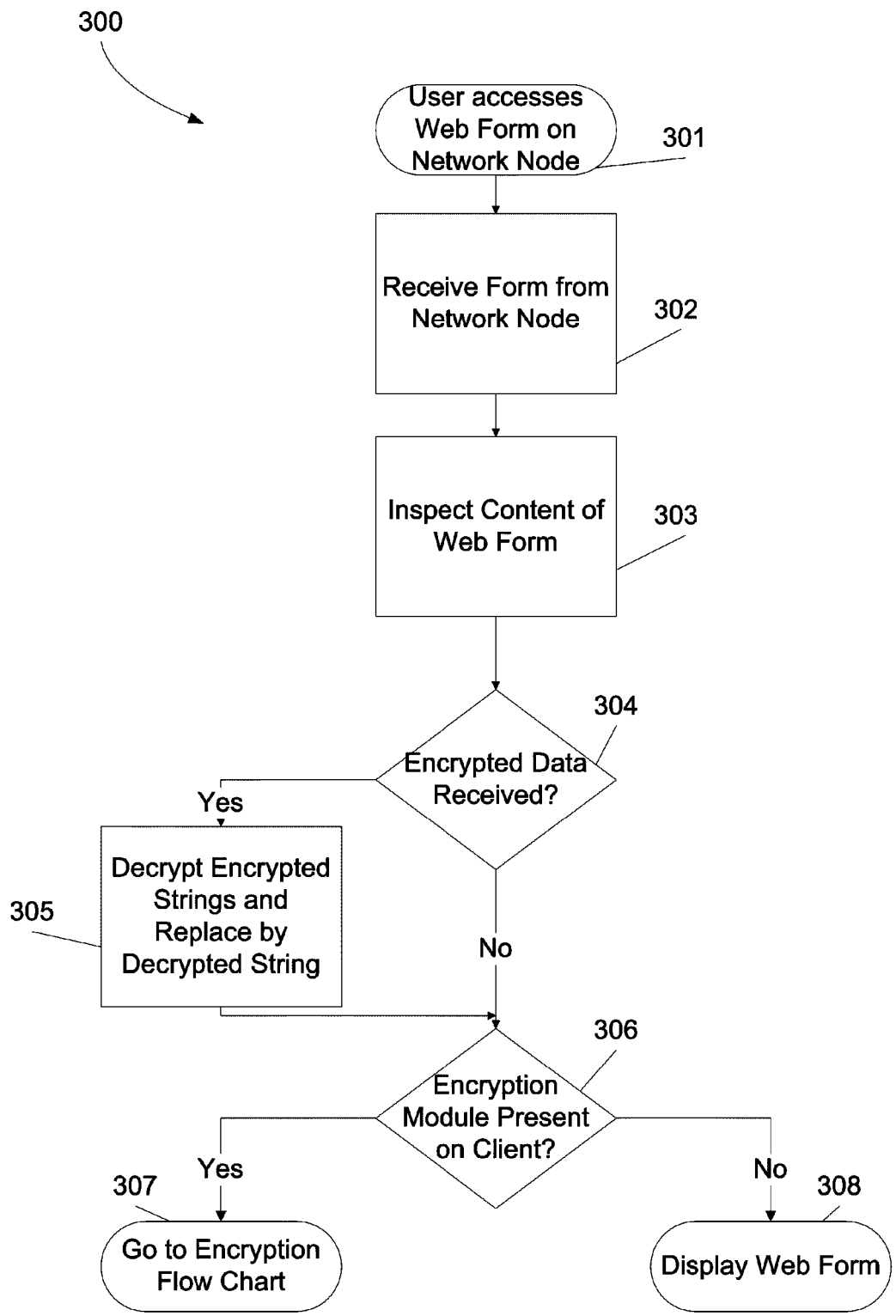
FIG. 3 is a flowchart of a method for decrypting data, according to some embodiments of the present invention.

Reference is also made to FIG. 3, which is a flowchart 300 of a method for decrypting data, according to some embodiments of the present invention. As shown at 301, the client terminal 103 accesses fields of digital data or a plurality of data sequences comprised of one or more textual strings from a form or other data structure on a network node, and the client terminal retrieves the data 302. The decryption module inspects the retrieved data 303, and if any encrypted data strings are found 304, subject to possession of a valid decryption key, the decryption module decrypts them for display 305. In some embodiments of the present invention, the encryption module is enabled on the client terminal, and after the decryption module processes the retrieved data, the result data from the decryption module may be inspected by the encryption module to modify field attributes before display 307. In some embodiments of the present invention, the encryption module is not enabled on the client terminal, and after the decryption module processes the retrieved data, the result data from the decryption module is displayed 308.

Figure 4:
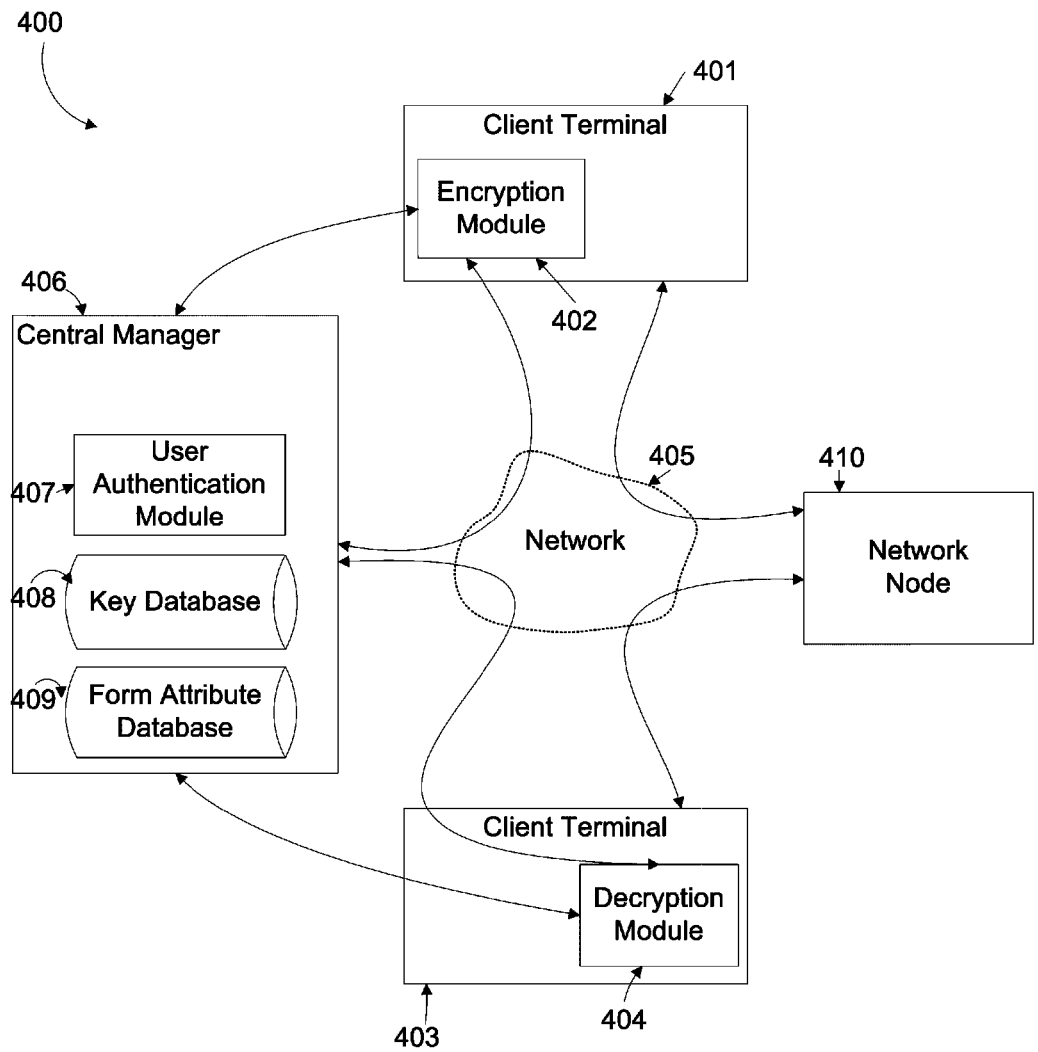
FIG. 4 is a block diagram of client terminals accessing a central manager and/or a network node via a computer network to store or retrieve data, where some of the data may be encrypted or decrypted by the client terminal, according to some embodiments of the present invention.

Reference is also made to FIG. 4, which is a simplified illustration showing a conceptual view of a system, according to some embodiments of the present invention. An encryption module 402 may selectively encrypt client digital content transmitted to a network node 410 by a client terminal 401. A decryption module 404 may decrypt digital content received by a client terminal 403 from the network node 410. The client terminal 401 accesses a field of digital data in a form managed by the network node 410 via a computer network 405. A user uses the client terminal 401 to fill-in one or more fields with digital content consisting of textual strings. The client terminal 401 is equipped with the encryption module 402. The encryption module 402 obtains a stored encryption key from a key database 408 in a central manager 406.

In some embodiments of the present invention, the encryption module 402 selectively encrypts digital strings of character data provided by a user in fields via the client terminal 401 by employing an encryption key which is optionally selected from the key database 408 in the central manager 406. The client terminal 401 transmits the output of the encryption module 402 to the network node 410 via the network 405.

Optionally, the client terminal 403 accesses a field of digital data in a form from the network node 410 via the computer network 405. The client terminal 403 is equipped with the decryption module 404. The decryption module 404 obtains a decryption key from the key database 408 in the central manager 406. The decryption module 404 decrypts encrypted digital strings of character data which have been transmitted from the network node 410 to the client terminal 403 by employing a decryption key selected from the key database 408 in the central manager 406. The output of the decryption module 404 is displayed by the client terminal 403.

Optionally, the encryption module 402 transmits user registration data to a user authentication module 407 in the central manager 406. The user authentication module 407 validates the user registration data, and upon successful validation the central manager 406 sends an encryption key from the key database 408 to the encryption module 402.

Optionally, the client terminal encryption module 402 transmits user registration data to the user authentication module 407 in the central manager 406. The user authentication module 407 validates the user registration data, and upon successful validation the central manager 406 sends form attributes from a form attribute database 409 to the client terminal encryption module 402.

Optionally, the decryption module 404 transmits user registration data to the user authentication module 407 in the central manager 406. The user authentication module 407 validates the user registration data, and upon successful validation the central manager 406 sends a decryption key from the key database 408 to the decryption module 404.

Optionally, the client terminal decryption module 404 transmits user registration data to the user authentication module 407 in the central manager 406. The user authentication module 407 validates the user registration data, and upon successful validation the central manager 406 sends form attributes from the digital form attribute database 409 to the client terminal decryption module 404.

Optionally, the central manager 406 with its component user authentication module 407, its component key database 408, and its component form attribute database 409, resides on a separate network node from the encryption module 402. Communications between the encryption module 402 and the central manager 406 with its components 407, 408, 409 occur via the network 405.

Optionally, the central manager 406 with its component user authentication module 407, its component key database 408, and its component form attribute database 409, resides on a separate network node from the decryption module 404. Communications between the decryption module 404 and the central manager 406 with its components 407, 408, 409 occur via the network 405.

Optionally, the central manager 406 with its component user authentication module 407, its component key database 408, and its component form attribute database 409, resides on the same network node as the encryption module 402. Communications between the encryption module 402 and the central manager 406 with its components 407, 408, 409 occur directly, thus bypassing the network 405.

Optionally, the central manager 406 with its component user authentication module 407, its component encryption and decryption keys 408, and its component form configuration attributes 408, resides on the same network node as the decryption module 404. Communications between the decryption module 404 and the central manager 406 with its components 407, 408, 409 occurs directly, thus bypassing the network 405.

Figure 5:
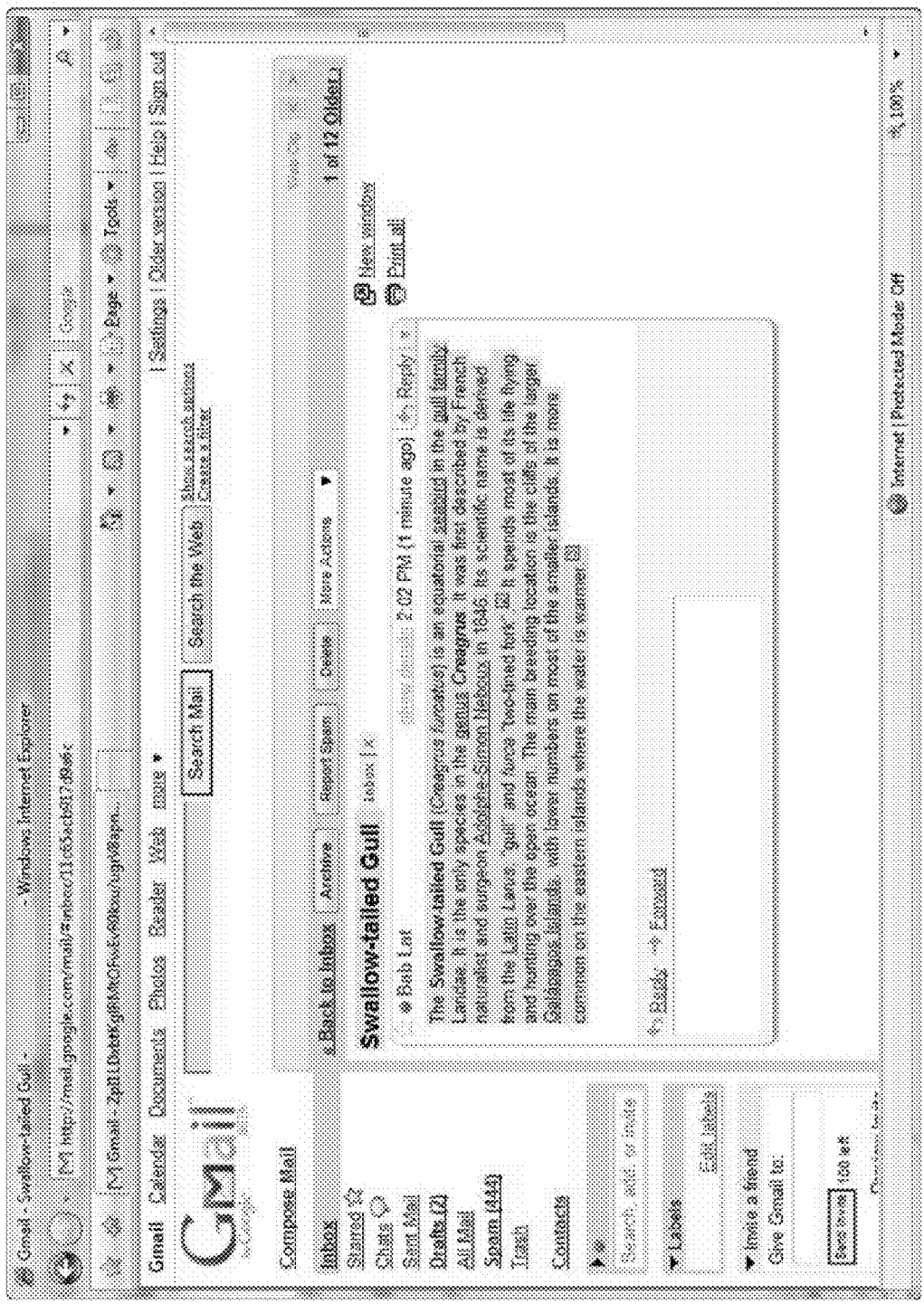
FIG. 5 is a screen shot depicting highlighting of encrypted fields.

Optionally, the client terminal 401, 403 provides an indication that data in a field is encrypted when sent and/or received to and/or from the network node. Indications of encrypted data may comprise highlighting, coloring, font, an image, an icon, and other optical effects, for example as depicted in FIG. 5.

Figure 6:
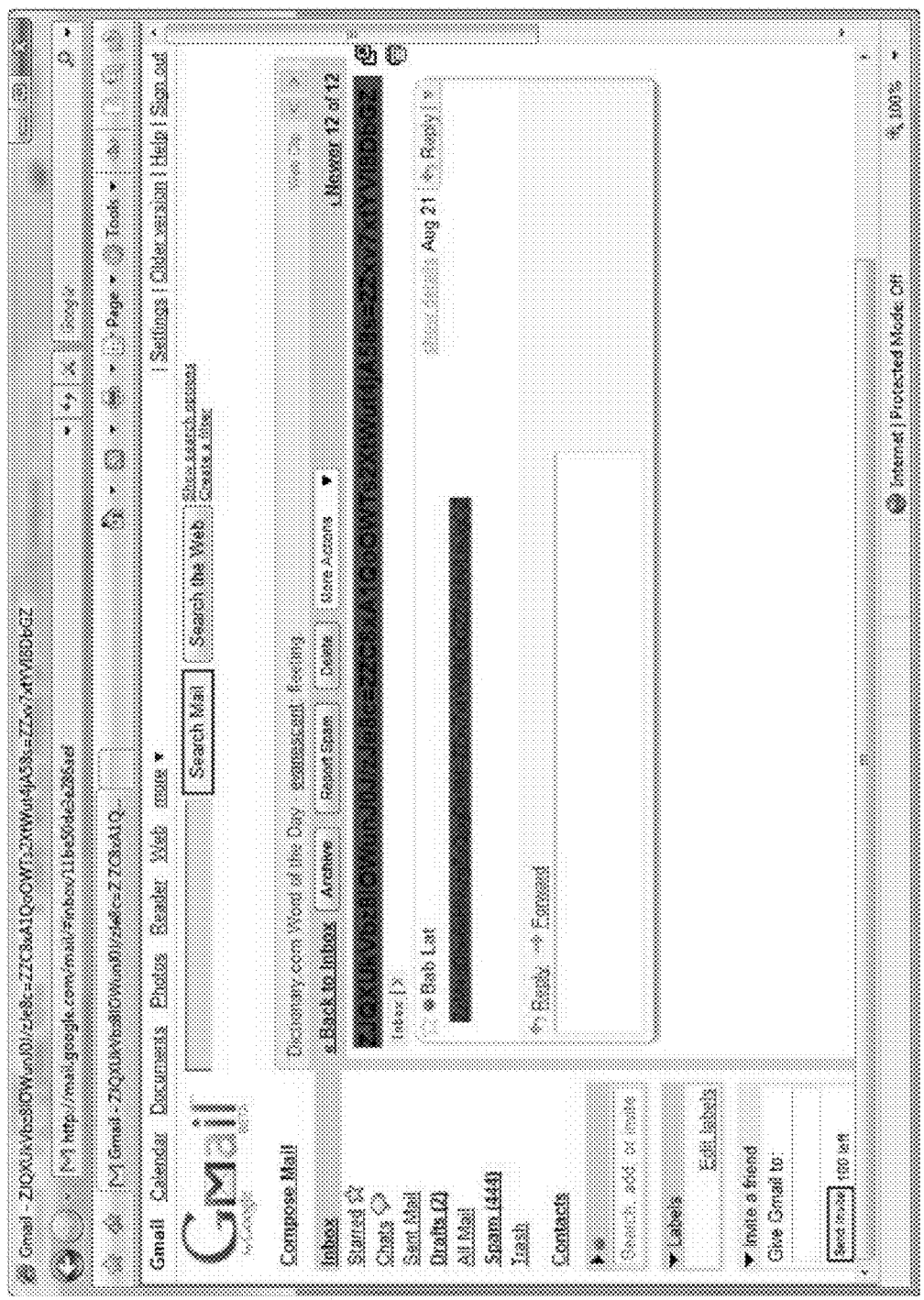
FIG. 6 is a screen shot depicting highlighting of fields for which decryption failed.

Optionally, the client terminal 403 provides an indication that data decryption in a field failed. Indications of decryption failure may comprise highlighting, coloring, font, an image, an icon, and other optical and audio effects. Decryption failure of data in a field may occur when the client terminal 403 does not have a valid decryption key or when the data in the field is corrupted, for example as depicted in FIG. 6.

Figure 7:
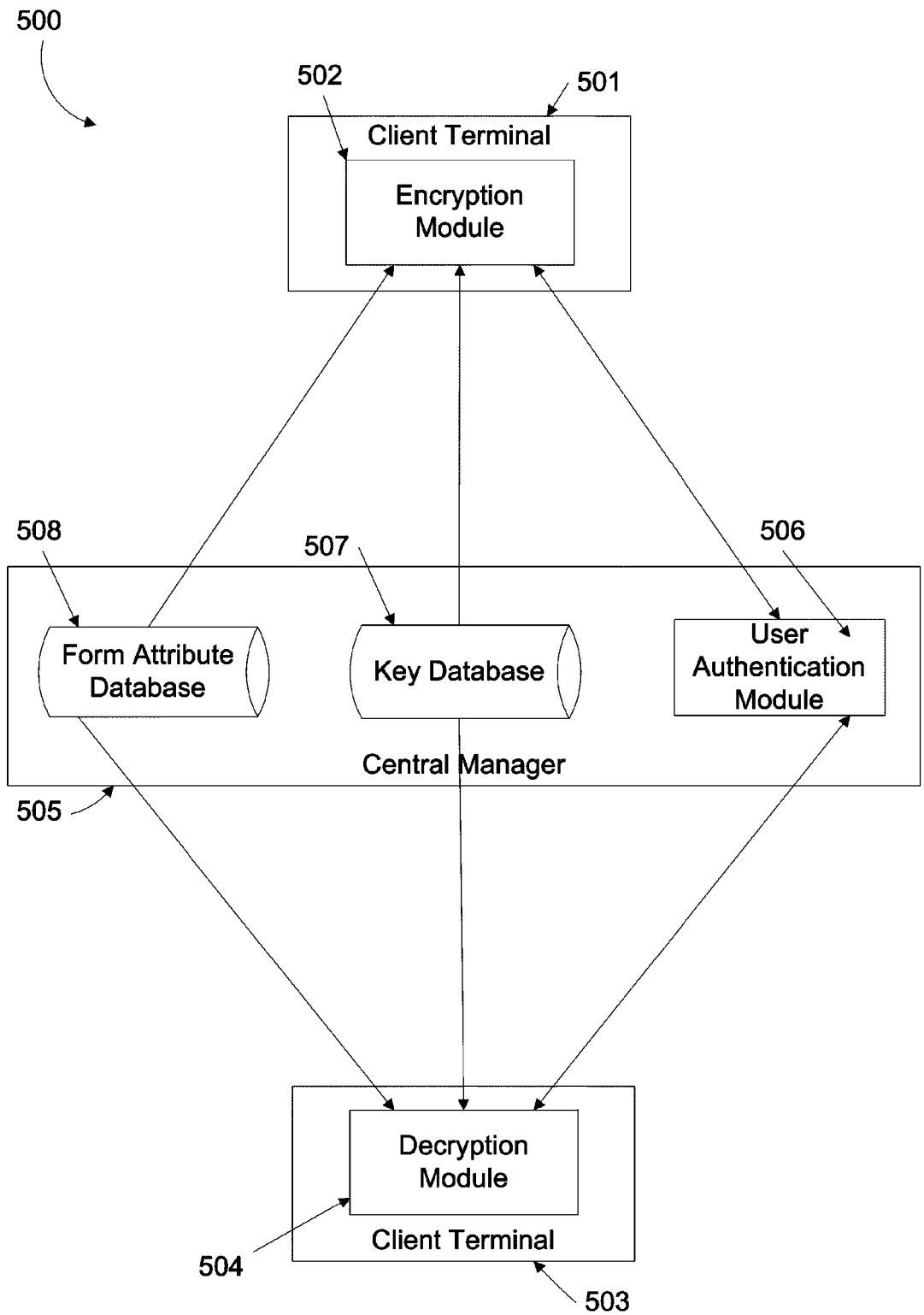
FIG. 7 is a block diagram, showing a client terminal accessing the central manager to verify client authorization and to retrieve configuration information, according to some embodiments of the present invention.

Reference is also made to FIG. 7, which is a simplified illustration showing a conceptual view a client terminal 501 with its component encryption module 502 and a client terminal 503 with its component decryption module 504 interacting with a central manager 505 and its components, according to some embodiments of the present invention. Optionally, the encryption module 502 sends user authentication information to a user authentication module 506 before performing any encryption. After the user authentication module 506 verifies the authentication information, the central manager 505 sends an encryption key from a key database 507 and/or form attributes from a form attribute database 508 to the encryption module 502.

Optionally, the decryption module 504 sends user authentication information to the user authentication module 506 before performing any decryption. After the user authentication module 506 verifies the authentication information, the central manager 505 may send a decryption key from the key database 507. After the user authentication module 506 verifies the authentication information, the central manager may send form attributes from the digital form attribute database 508 to the decryption module 504.

Optionally, the encryption module 502 and the central manager 505 with its component user authentication module 506, its key database 507, and its form attribute database 508 reside on the same network node. In some embodiments of the present invention, the central manager 505 sends an encryption key from the key database 507 and/or form attributes from the digital form attribute database 508 to the encryption module 502 without requiring user authentication.

Optionally, the decryption module 504 and the central manager 505 with its component user authentication module 506, its key database 507, and its form attribute database 508 reside on the same network node. In some embodiments of the present invention, the central manager 505 sends a decryption key from the key database 507 and/or form attributes from the digital form attribute database 508 to the decryption module 504 without requiring user authentication.

Optionally, the encryption module 502 uses different encryption keys for different network nodes. For example, the encryption module may use a particular encryption key for destination Gmail™, and it may use a different encryption key for destination Salesforce.com™. Optionally, the encryption module uses different encryption keys for different destination users at the same network node. For example, the encryption module may use a particular encryption key when sending information to a user's accountant on Yahoo™ mail, and it may use a different encryption key when sending information to a user's lawyer on Yahoo™ mail.

Optionally, information in the key database 507 is managed by an administrator who is responsible for encryption and/or decryption keys on behalf of users in an organization. Optionally, information in the key database 507 is managed by individual users in an organization. Optionally, encryption keys and/or decryption keys in the key database 507 are shared by members of an organization. Optionally, encryption keys and/or decryption keys are not shared by members of an organization.

Optionally, information in the digital form attribute database 508 is managed by an administrator who is responsible for forms on behalf of users in an organization. Optionally, information in the digital form attribute database 508 is managed by individual users in an organization. Optionally, form attribute information in the digital form attribute database 508 is shared by members of an organization. Optionally, form attribute information is not shared by members of an organization.

In some embodiments of the present invention, the central manager 505 performs statistical analysis of form attribute settings stored in the digital form attribute database 508 and recommends form attribute settings to users based on the analysis. The statistics and/or recommendations may be for form default attribute settings and/or field attribute settings. Optionally, input for central manager 505 recommendations comprises analysis of manual user encryption actions. Optionally, input for central manager 505 recommendations comprises data from external sources.

Figure 8:
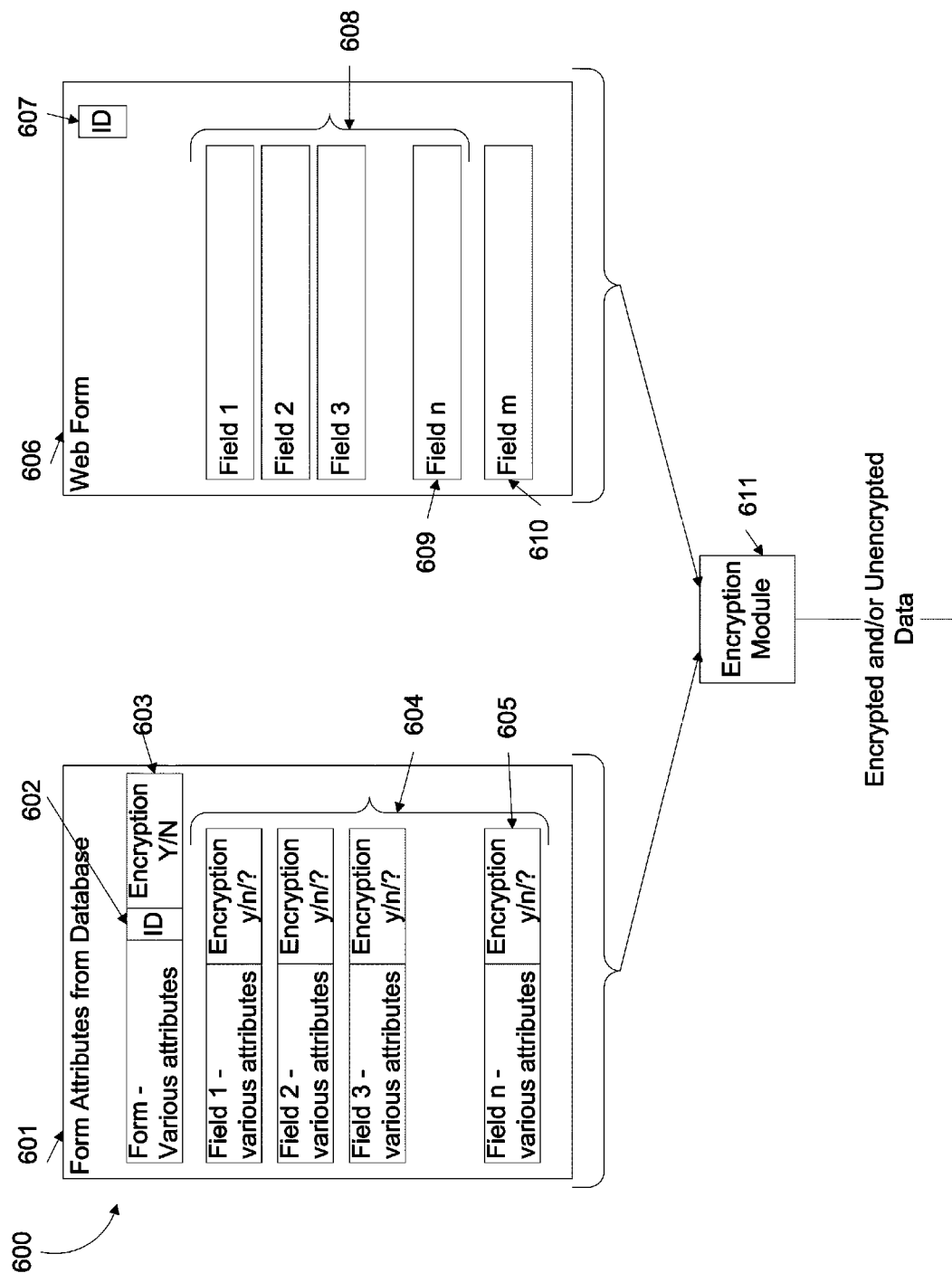
FIG. 8 is a block diagram of inputting a web form and web form attributes stored in a database to the encryption module in a manner that allow the encryption module to determine which fields contain data to be encrypted, according to some embodiments of the present invention.

Reference is also made to FIG. 8, which is a simplified illustration showing a conceptual view of how form attributes 601 that describe a web form 606 and which are stored in the digital form attribute database 508 affect the encryption process, according to some embodiments of the present invention. Optionally, an encryption module 611 obtains form attribute information 601 such as a form default encryption attribute and field encryption attributes from the digital form attribute database 508 in a central manager. For example, according to some embodiments of the invention, form attribute information corresponding to the Yahoo™ Mail email composition form is stored in the digital form attribute database. The digital form attribute information 601 includes identification information 602 that corresponds to identifying information 607 of a web form 606. Identification information may comprise individual attributes or a combination of attributes such as a URL and/or an imbedded identifier string. For example, according to some embodiments of the invention, part of the Yahoo™ Mail email composition form URL may be configured as a form database ID corresponding to the Yahoo™ Mail email composition web form. The digital form attribute information 601 includes a default encryption indicator 603. In the Yahoo™ Mail email composition form example, the default encryption indicator may specify that field data should not be encrypted. The digital form attribute information 601 also includes attribute information for at least one field 604. Every field for which attributes have been configured includes an encryption attribute 605. Each field encryption attribute 605 may assume values specifying one of the following three actions to be taken by the encryption module 611:

The encryption module 611 encrypts data in a corresponding web form field 609.

The encryption module 611 does not encrypt data in the corresponding web form field 609.

The encryption module 611 uses the digital form default encryption indicator 603 to determine whether or not to encrypt data in the corresponding web form field 609. In the Yahoo™ Mail email composition form example, the field used for entering the body of the email indicates that the field data will be encrypted.

Figure 9:
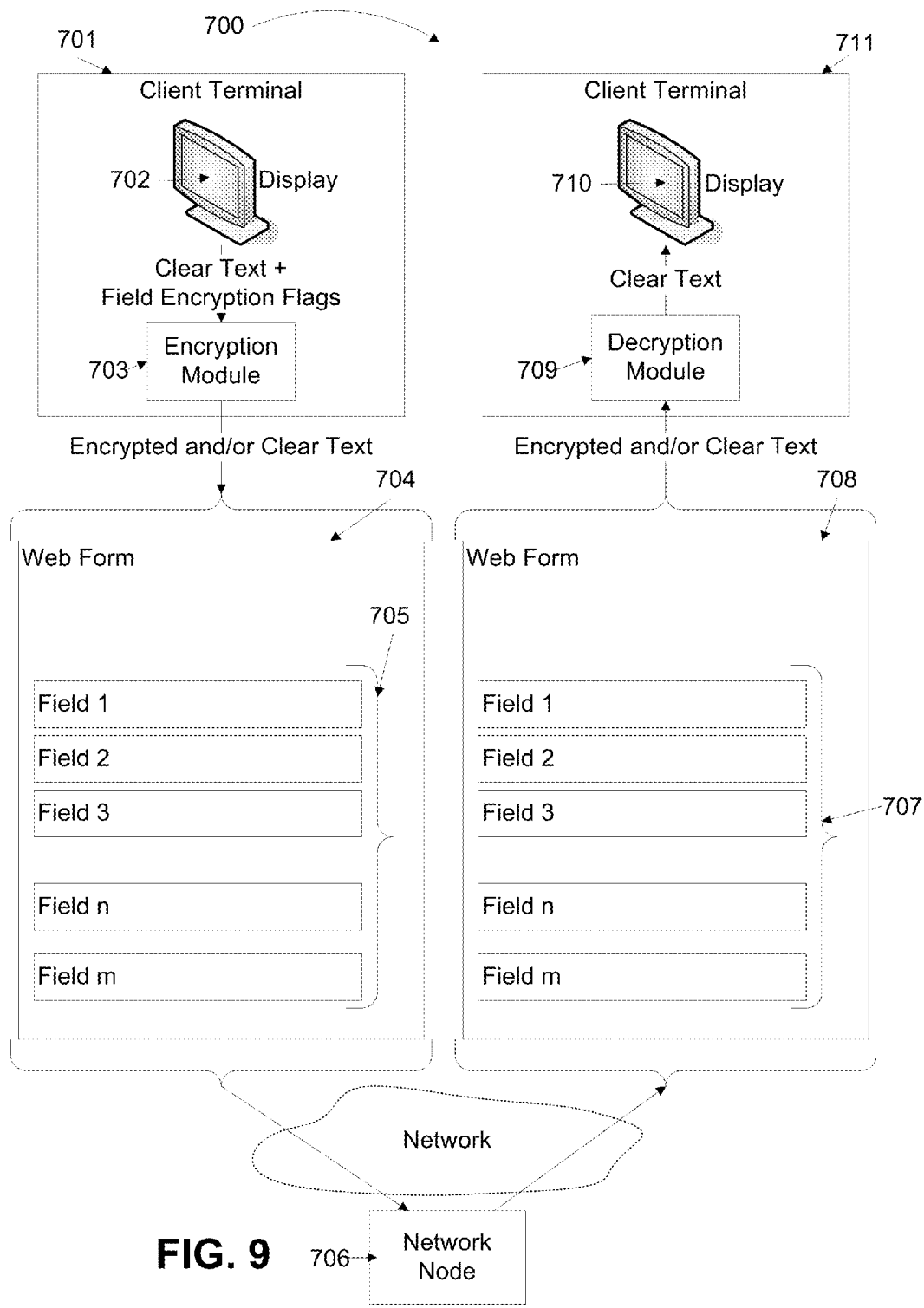
FIG. 9 is a block diagram showing data flows from the client display through the encryption module to the network node and from the network node through the decryption module to the client display, according to some embodiments of the present invention.

Reference is also made to FIG. 9, which is a simplified illustration showing a conceptual view of how a user may manually select fields for data encryption and/or the system may automatically select fields for data encryption, according to some embodiments of the present invention. Optionally, a user may manually select an editable field on a client terminal display 702 for encryption. Optionally, a user manually selecting an editable field on the client display 702 for encryption enables ad hoc encryption of a generic web form. Optionally, a user manually selects part of the data in an editable field on a client terminal display 702 for encryption so that the data selected by the user is encrypted, and the unselected data in the field is not encrypted. Optionally, a user manually selects part of the data in an editable field on a client terminal display 702 for encryption so that the data selected by the user is not encrypted, and the unselected data in the field is encrypted. As used herein a client terminal display means a cathode ray tube (CRT) display, a liquid crystal display (LCD), a plasma display, an IBM 3276 display station, a flat panel, a cellular telephone built-in display screen, and/or any other presentation unit which is used by the client terminal for displaying digital content to the user. In some embodiments of the present invention, the user may place a cursor on a field and click a mouse button to select the field. Optionally, a user may select a field with a cursor and click a button on a screen toolbar to select the field. While a web form is visible on the user's client terminal display 702, the user may flag one or more editable fields for encryption. After the client terminal display 702 sends its data to an encryption module 703, the encryption module 703 uses the flags set by the user to selectively encrypt data in fields 705 in a web form 704 before a client terminal 701 transmits the web form 704 including encrypted and/or non-encrypted data in fields to a network node 706.

Optionally, the network node 706 sends a web form 708 including encrypted and/or non-encrypted data in fields 707 to a client terminal 711. In the client terminal 711, a decryption module 709 detects any encrypted data in fields among all the fields 707 in the web form 708, decrypts all encrypted data in fields, replaces encrypted field data by the decrypted data in the fields 707, and sends the updated web form 708 to a client terminal display 710.

Optionally, the network node 706 sends a data stream comprising encrypted character strings to the client terminal 711. In the client terminal 711, the decryption module 709 may detect the encrypted character strings, decrypt the encrypted character strings, replace the encrypted character strings by the decrypted character strings, and/or send the updated data stream to the client terminal display 710.

Optionally, the encryption module 402 automatically selects for encrypting some or all of the textual strings 705 which have been filled in the fields. Optionally, automatically selecting fields on the client display 702 for encryption enables ad hoc encryption of a generic web form. For example, the encryption module 402 may be configured to identify fields by type or by attribute such as alphabetic and/or numeric fields, fields of a specified length, and/or fields containing a specified substring. Credit card numbers, bank account numbers, social security numbers, telephone numbers and passwords are examples of substrings that may be configured for automatic encryption. While a web form is visible on the user's client terminal display 702, the user fills in a field. When the user transmits data from the terminal display 702, the client terminal display 702 may send its data to the encryption module 703, the encryption module 703 may analyze the transmitted data to identify fields that fulfill conditions for which the system has been configured and encrypt the data which is filled in them. When the encryption module 703 finishes processing the data sent to it by the client terminal 701, the encryption module 703 sends the result data to the client terminal 701 which transmits the encrypted and/or non-encrypted data in fields to the network node 706.

Optionally, a user entering data into the client terminal 701 manually overrides an automatic encryption configuration to force the client terminal to transmit encrypted data. Optionally, a user entering data into the client terminal 701 manually overrides an automatic encryption configuration to force the client terminal to transmit unencrypted data.

Optionally, a user entering data into the client terminal 701 manually causes the client terminal 701 to encrypt the data in the fields 705 without transmitting the web form 704 and to display the encrypted data in the fields on the client terminal 701.

Figure 10:
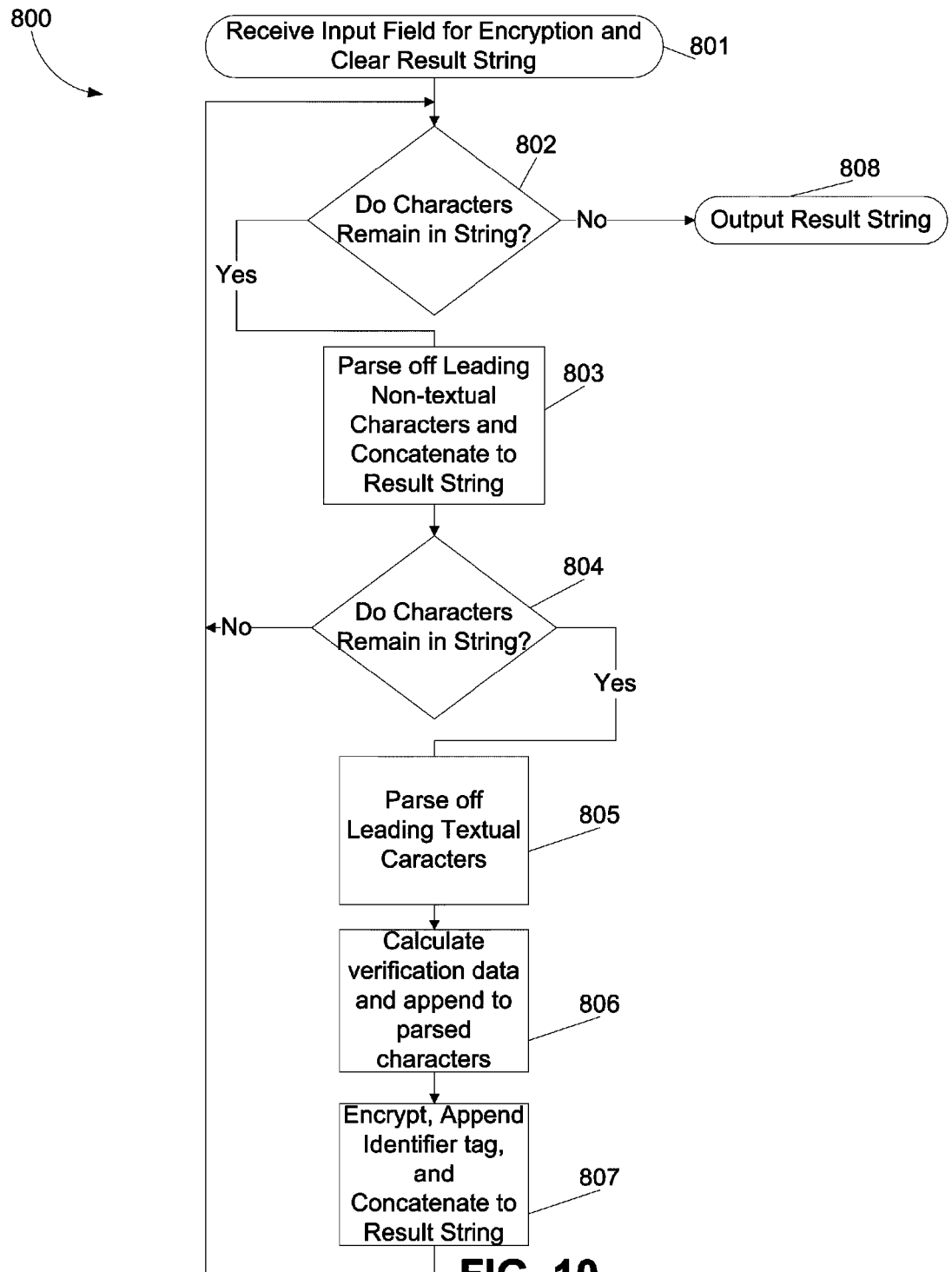
FIG. 10 is a flowchart of a method for encrypting discrete character strings within a field, according to some embodiments of the present invention.

Reference is also made to FIG. 10, which is a flowchart 800 of a method for separately encrypting textual character strings within a field such that identical sequences of textual characters delimited by non-textual characters will always result in identical ciphertext, according to some embodiments of the present invention. This permits an application or service on a network node that indexes words in a field of unencrypted data for subsequent searching to provide the same capabilities for encrypted data. As shown in 801, the encryption module 402 receives an input string of characters from the client terminal 401 and clears a result string. If the initial input string is empty 802, the encryption process ends, and the encryption module 402 outputs an empty string 808. If there are leading non-textual characters in the input string such as blanks and tabs, the encryption module 402 truncates these leading characters from the front of the input string and concatenates them to the end of the result string 803. If there are no textual characters remaining in the input string 804, the encryption process ends, and the encryption module 402 outputs the result string 808. If there are unprocessed textual characters remaining in the input string, the encryption module 402 parses out the leading textual characters, and truncates from the front of the input string 805. The parsing process delineates the textual substrings by non-textual characters such as white-space before and/or after the textual characters. The encryption module 402 calculates a token for later validation of the encryption and decryption processes and adds it to the just parsed textual characters 806. In some embodiments of the present invention, the aforementioned token for later validation is a checksum. To validate that a token was successfully decoded and decrypted, some form of result-validation is required. The encryption module 402 will add a checksum character to the end of the text before it is encrypted. This allows the decryption module 404 to validate the checksum after decrypting the encrypted string and verify that the process was performed successfully. In some embodiments of the present invention, a special character, for example punctuation, is treated as a non-textual character.

The encryption module 402 then encrypts the parsed textual characters, together with the added token 807. The encryption module 402 then adds an identifier to the ciphertext so that it can later be identified for decryption. In some embodiments of the present invention, an identifier, "_enc_", or "z" is concatenated to the front and/or end of the ciphertext string to facilitate subsequent identification of ciphertext strings. The encryption module 402 then concatenates the resulting cipher text to the end of the result string 807. At this point, the encryption module 402 processes the input string again from point 802, wherein all processed characters from the front of the input string have been truncated, until all the characters of the input string have been truncated, and the string is empty. When the input string is empty, the encryption module 402 outputs the result string to the client terminal 401 and the process ends 808. In some embodiments of the present invention, the encryption module may preserve the existing case of the alphabetic characters of the strings it receives. In some embodiments of the present invention, the encryption module 402 may change all of the alphabetic characters to upper case or to lower case to cause the generation of identical ciphertext result strings when strings of textual input differ only in the case of the alphabetic characters.

Reference is also made to FIG. 11, which is a simplified example showing a conceptual view of how two sample strings of character data would be encrypted according to some embodiments of the present invention. A client user terminal 401 forwards string 902A into an encryption module 901 which subsequently generates a result string 903A. Specifically, the substring 904A in the forwarded string causes the encryption module 901 to generate the ciphertext substring 909A in the result string 903A, and the substring 905A in the forwarded string causes the encryption module 901 to generate the ciphertext substring 910A in the result string 903A. A client user terminal forwarded another input string 902B into the encryption module 901 which subsequently generates a result string 903B. Specifically, the substring 904B in the forwarded string causes the encryption module 901 to generate the ciphertext substring 909B in the result string 903B, and the substring 905B in the passed string causes the encryption module 901 to generate the ciphertext substring 910B in the result string 903B. Since 904A and 904B are identical textual character sequences, the resulting ciphertext substrings 909A and 909B are identical to each other when identical encryption algorithms and keys are used. Similarly, since 905A and 905B are identical textual character sequences, the resulting ciphertext substrings 910A and 910B are also identical when identical encryption algorithms and keys are used.

For example, using advanced encryption standard (AES) without the present invention to separately encrypt each of the following, the phrases:
  1. "and god said"
  2. "let there be light"
  3. "and there was light"
  may generate a single result string for each phrase.

Such encryption precludes the indexing of individual words and prevents searching for individual words. However, by encrypting each word individually, the encryption module generates separate ciphertext strings for each word in a phrase. In such a manner, when a user runs a search for the word "light" in the present example, using the same encryption technique for the search argument as was used for the original text entry, the encryption module translates "light" to identical ciphertext, and the network node will be able to find and retrieve the relevant phrases without being able to decrypt to the original word "light".

In some embodiments of the present invention, cryptography is symmetric, i.e., decrypting ciphertext comprises using the same cryptographic key used to generate the ciphertext. In some embodiments of the present invention, cryptography is asymmetric, also known as public key cryptography, i.e., a public key is used for encryption and a separate paired private key is used for decryption.

In some embodiments of the present invention, a user may manually instruct the client terminal 401 to suppress separate encryption of textual character strings within a designated field such that the entire content of the field is encrypted as a single data block. Optionally, the encryption module 402 encrypts the entire content of the designated field, for example en masse, without regard for textual substring delineation. Optionally, form attribute information may cause the encryption module to suppress separate encryption of alpha numeric character strings in one or more designated fields. Examples of reasons for suppressing the separate encryption are space limitations in a field when the ciphertext result is larger than the input data, including non-textual data in the encryption process, and strengthening the encryption.

Figure 12:
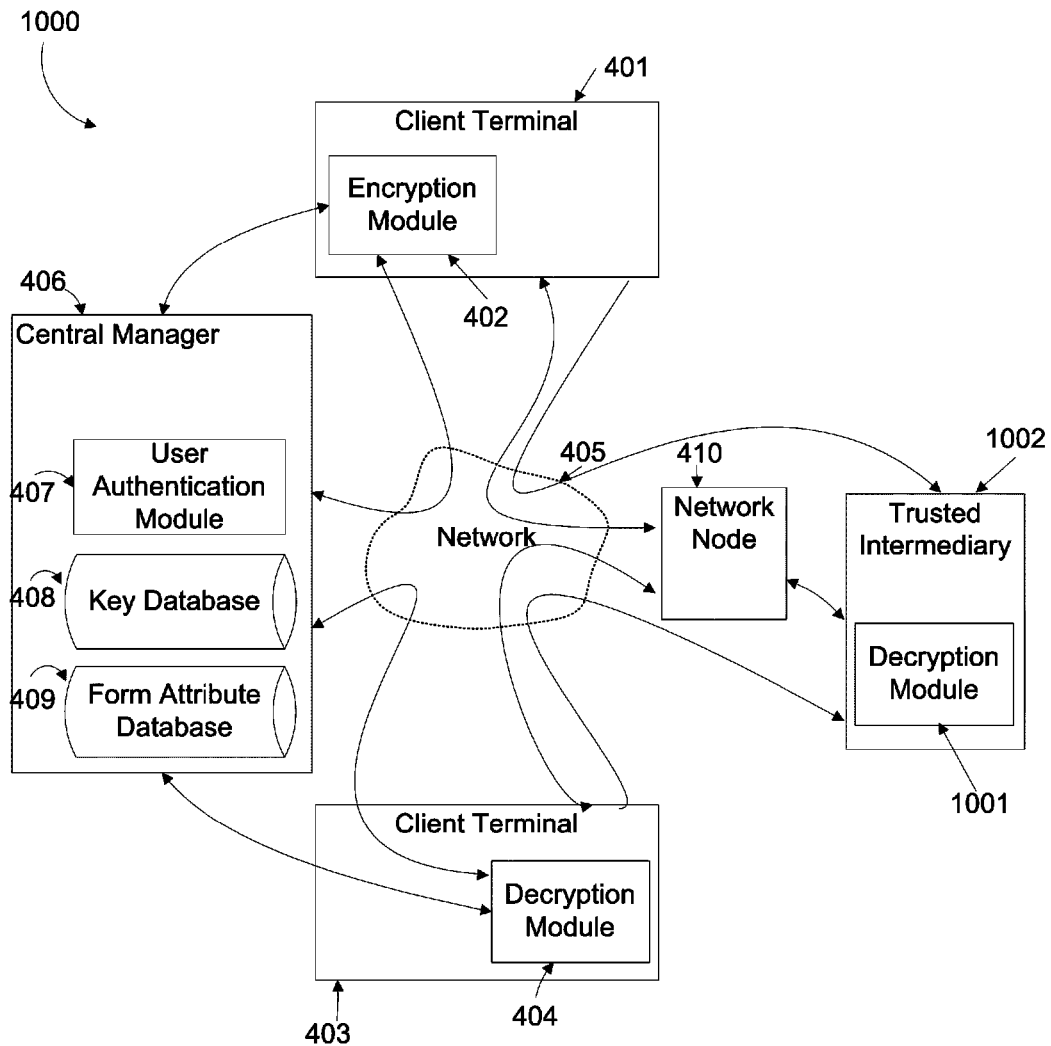
FIG. 12 is a simplified block diagram illustrating elements of a system for encrypting data and a non-specific data flow between elements with trusted intermediaries, according to some embodiments of the present invention.

In some embodiments of the present invention, the encryption module 402 encrypts some strings in a field and ignores other strings in the field. For example, the encryption module may ignore words appearing in a list and pass those words unencrypted to the result string in the encryption process. In another example, the encryption module may stop encrypting the contents of an input field when the resulting ciphertext exceeds a maximum length associated with the field. In yet another example, the encryption module 402 may store the encrypted result in a database, on a server, or in another location and replace the result string by a reference such as a link or a verbal description Reference is also made to FIG. 12, which is a simplified illustration showing a conceptual view of a system, according to some embodiments of the present invention in which a trusted intermediary 1002 may provide limited information about the encrypted data sent from the client terminal 401 to the network node 410. For example, if the user of a client terminal 401 sends an email message to Gmail™, the trusted intermediary 2002 may send unencrypted words in the message to Gmail™, and Gmail™ may send targeted advertising to the client terminal 401.

A decryption module 1001 may decrypt digital content received from client terminal 401 via the trusted intermediary 2002. Optionally, the decryption module 1001 decrypts digital content sent to client terminal 403. Some information from the decryption module 1001 may be sent to the network node 410 by the trusted intermediary 2002. In some embodiments of the present invention, the client terminal 401 transmits encrypted digital content to the trusted intermediary 2002 in addition to transmitting the encrypted digital content to the network node 410. In some embodiments of the present invention, the client terminal 401 transmits the encrypted digital content to the trusted intermediary 2002, and the trusted intermediary 2002 transmits the encrypted digital content to the network node 410. The decryption module 2001 may decrypt the encrypted digital content, and the trusted intermediary 2002 may send decrypted strings of digital content network node 410. For example, a user writes an email and wants the content of the email to be encrypted in a manner that does not allow the email provider to understand it. The user enters text into a send-mail form via a client terminal, and the client terminal transmits the data, comprising encrypted subject and body fields, to the email provider that stores the content of the email. As the email provider received encrypted content, it cannot match targeted advertisements and/or otherwise analyze it. The email provider may forward the stored content and/or any variation thereof to the trusted intermediary 2002 that may decrypt the encrypted content, and reply with matched advertisements and/or selected words that may allow the email provider to select advertisements. Optionally, the trusted intermediary 2002 provides one or more targeted advertisements to the encrypting client terminal based on the encrypted content. The targeted advertisements may be provided in any known advertising method.

Reference is also made to FIG. 13, which is a simplified illustration showing a conceptual view of a system, according to some embodiments of the invention in which encryption and/or decryption is performed by a network server. In such embodiments, encryption and/or decryption are performed on behalf of a client terminal by a central encryption module 1101 and/or a decryption module 1102. In an organization with a plurality of users, this configuration has advantages for maintaining the software. Whereas other embodiments may require maintenance updates to be applied to every instance of encryption modules and/or decryption modules on each client terminal hosting the modules, the present embodiment may be maintained in one location. Additionally, in the present embodiment, an administrator may enable and/or disable the use of the invention by all client terminals in the organization at any moment in time, whereas in other embodiments an administrator may enable and/or disable the use of the invention on all client terminals after a delay.

Reference is also made to FIG. 14, which is a simplified illustration showing a conceptual view of a system, according to some embodiments of the invention in which in conjunction with a virtual private network (VPN) and/or using a proxy. In such embodiments of the invention, communications between client terminals 401, 403 and an organizational network are encrypted by the VPN components and/or a proxy (not depicted in the figures). In addition, an encryption module 1201 performs further encryption of data in separate fields on behalf of the client terminal 401 for data transmitted to a network node outside of the VPN and/or connected to the proxy. In addition, a decryption module 1202 performs further decryption of data in separate fields on behalf of the client terminal 403 for data received from a network node outside of the VPN and/or connected to the proxy.

An encryption module 1101 resides on the central manager 406, functions as a proxy, and performs encryption on behalf of a client terminal 401. The client terminal 401 may transmit data destined for the network node 410 to the encryption module 1101; the encryption module 1101 encrypts the data and transmits the encrypted data to the client terminal 401, and the client terminal 401 sends the encrypted data to the network node 410.

A decryption module 1102 residing on the central manager 406, functions as a proxy, and performs decryption on behalf of the client terminal 403. The client terminal 403 may transmit data received from the network node 410 to the decryption module 1102; the decryption module 1102 decrypts the data and transmits the decrypted data to the client terminal 403.

In some embodiments of the present invention, an application program interface (API) may enable application programs to submit function requests to a central manager 105. In some embodiments of the present invention, a central manager API may accept function requests to modify information managed by a user authentication module 106. In some embodiments of the present invention, a central manager API may accept function requests to modify a key database 107. In some embodiments of the present invention, a central manager API may accept function requests to modify a form attribute database 108.

In some embodiments of the present invention, a network node, such as a website, may use a central manager API to request that form attribute information in the form attribute database 108 be updated, wherein the form attribute information to be updated is associated with forms residing on the network node requesting the update. In such a manner, a service provider, such as Gmail™, may manage encryption attributes for users accessing the service provider's site.

In some embodiments of the present invention, a network node, such as a website, may place an indicator in a form to request that an encryption module 102 encrypt a field. In such a manner, a service provider, such as Gmail™, may manage encryption attributes for users accessing the service provider's site.

In some embodiments of the present invention, content to be encrypted is a file attachment. Optionally, when the file attachment contains textual data, the encryption module 102 may separately encrypt fields in the attachment. Optionally, when the file attachment contains only non-textual data, the encryption module 102 may encrypt the entire attachment as a unit. Optionally, when the file attachment contains textual and non-textual data, the encryption module 102 may separately encrypt textual and non-textual data. Examples of file attachments include Microsoft WORD™ documents, spreadsheets, such as EXCEL™ spreadsheets, presentations, such as Powerpoint™ presentations, graphics interchange format (GIF) files, text files, and zip files.

Some examples of how the invention may be used follow.

In one example of an embodiment, two members of an organization, John and Jane, need to communicate via email across an insecure network using Hotmail™. John signs onto the system which verifies his registration information and then provides the encryption module with an encryption key and a form that matches Hotmail's™ email sending page. John writes his email and sends it. The encryption module encrypts the body and/or subject of the email before John's terminal transmits the message to Hotmail™. Hotmail™ receives John's message and stores it on a Hotmail™ server. Jane accesses the email from a different computer on which the invention has not been installed. When she views the email, she can only see unintelligible ciphertext in the body and/or subject of the email message. Jane then signs onto a computer on which the invention has been installed. The system verifies her registration information and then provides the decryption module with a decryption key. Jane accesses her Hotmail™ account and retrieves the email. The decryption module detects that the body and subject of the email are encrypted and decrypts them before displaying them to Jane.

In another example of an embodiment, Jane set up a website, such as collaborative Web site, for example Wiki, for her organization using Google Sites, a service offered by Google for hosting web sites. Although Google offers security for the site, Jane is not convinced that unauthorized hackers will not be able to access the information posted on the site. In addition, she does not trust Google's own employees. To address this problem, Jane uses the present invention to encrypt data in selected fields on the web site. Members of Jane's organization receive sign-on information to the central manager, and Jane creates and stores form attributes for the web pages of her site in the digital form attribute database. After Jane enters information into the digital form displayed on her client terminal, the encryption module selectively encrypts data in fields of information before the client terminal transmits the information to the web site. The content of fields of information is stored on the web site as ciphertext. When members of Jane's organization access the web site with a client server on which the invention has been implemented and keys have been properly assigned and distributed, the decryption module decrypts the encrypted data in fields stored on the web site and they are displayed as clear text.

When someone accesses the information on a client terminal in which the invention is not enabled, the encrypted data in fields are illegible. It is expected that during the life of a patent maturing from this application many relevant systems and methods will be developed and the scope of the terms encryption module and decryption module is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for encrypting data, comprising the steps of:
   a) presenting, on a display of a client terminal, a document managed by a network node in communication with said client terminal via a computer network, said document including at least one unencrypted first textual string and at least one field for filing in by a user;
   b) receiving, from said user, via said client terminal, another at least one second textual string for filling in said at least one field;
   c) encrypting said another at least one second textual string, and maintaining said at least one unencrypted first textual string in an unencrypted state;
   d) adding an identifier to said at least one encrypted second textual string, said identifier used for identifying said at least one encrypted second textual string for decryption of said at least one encrypted second textual string by an entity separate from said network node, said entity for retrieving said at least one encrypted second textual string; and,
   e) sending said at least one encrypted second textual string and said added identifier, to said network node via said computer network
   f) filling in, by said network node, said at least one field of said document with said at least one encrypted second textual string and said added identifier, and maintaining said at least one unencrypted first textual string in said unencrypted state;
   wherein said network node is configured for storing and retrieving said document comprising said at least one unencrypted first textual string and said at least one encrypted second textual string and said added identifier without decrypting said at least one encrypted second textual string.

2. The method of claim 1, wherein said encrypting is performed by at least one of said client terminal and a proxy connected to said computer network.

3. The method of claim 2, wherein said at least one of said client terminal and said proxy are physically separated from said network node.

4. The method of claim 1, wherein said at least one textual string comprises a plurality of words.

5. The method of claim 4, wherein said encrypting comprising separately encrypting each one of said plurality of words.

6. The method of claim 4, wherein said encrypting is performed so as to allow searching said at least one encrypted textual string for each said word.

7. The method of claim 6, wherein said searching is performed without decrypting said at least one encrypted textual string.

8. The method of claim 1, wherein said at least one textual string is part of a plurality of textual strings, and said encrypting comprises identifying each said textual string of said plurality of textual strings as a separate content unit, and separately encrypting each said textual string of said plurality of textual, strings, and adding an identifier to each separately encrypted textual string.

9. The method of claim 1, wherein said network node is configured to allow at least one of an additional client terminal and a proxy to acquire said at least one encrypted textual string; further comprising the step of:

g) allowing said at least one additional client terminal and a proxy to decrypt said encrypted textual string at each said at least one additional client.

10. The method of claim 9, wherein said using comprises acquiring at least one encrypting key from a repository comprising a plurality of cryptographic keys, said encrypting being performed using said at least one encrypting key, said allowing comprising allowing said at least one additional client terminal and a proxy to acquire at least one respective decrypting key from said repository.

11. The method of claim 1, further comprising authenticating said user before said step c).

12. The method of claim 8, wherein said separately encrypting comprises: converting said at least one textual string to at least one respective binary ciphertext string, and converting each said respective binary ciphertext to an alphanumeric ciphertext.

13. The method of claim 8, wherein said separately encrypting comprises: adding an identifier to each said separately encrypted textual string, said identifier for processing each separately encrypted textual string to which a said identifier has been added.

14. The method of claim 1, wherein said at least one field of said document is designated for storing unencrypted data.

15. The method of claim 1, wherein said document includes a plurality of fields, and further comprises allowing said user to indicate said at least one field from said plurality of fields.

16. The method of claim 1, wherein said digital content includes a plurality of textual strings.

17. The method of claim 8, further comprising the steps of:
g) creating an index of said at least one separately encrypted textual string;
h) receiving a search query having said at least one textual string, and,
i) extracting said at least one separately encrypted textual string from said search query, wherein said extracting allows using said at least one separately encrypted textual string for responding said search query.

18. The method of claim 8, wherein said encrypting further comprises adding error handling information to each one of said at least one separately encrypted textual strings, thereby allowing a reliability validation during a decrypting thereof.

19. The method of claim 1, further comprising having the network node provide said encryption module with information for performing said encrypting.

20. The method of claim 1, wherein said document comprises a plurality of fields, and selecting said at least one field from said plurality of fields according to statistical usage data related to said document.

21. The method of claim 1, wherein said document includes at least one uploaded file.

22. A system for managing encryption of digital content, comprising:
a repository comprising a plurality of cryptographic keys each associated with a group of users; and
a managing unit configured for accessing said repository and providing each said cryptographic key to at least first and second members of a respective said group of users;
wherein said each provided cryptographic key is configured for allowing said first member to separately encrypt at least one first textual string of a message while maintaining at least one second textual string in an unencrypted state and for providing said encrypted at least one first textual string with an identifier to said network node placing content in a document by filling in at least one field of said document with said at least one encrypted first textual string and said added identifier and maintaining said at least one second textual string in said unencrypted state, said identifier used for identifying said at least one encrypted first textual string for decryption of said at least one encrypted textual string, said message comprising said at least one first encrypted textual string and said at least one second textual string in said unencrypted state forwarded over said computer network to a network node, and said second member to separately decrypt said at least one first encrypted textual string based on the recognition of said identifier wherein said at least one second textual string is maintained in said unencrypted state, said network node being configured for storing and retrieving said at least one first encrypted textual string with said identifier without decrypting said at least one first encrypted textual string while maintaining said at least one second textual string in said unencrypted text.

23. The system of claim 22, wherein said message is forwarded to a network node, said second member being configured for acquiring said at least one encrypted string from said network node.

24. The system of claim 22, wherein said message comprises data designated for filling in at least one field of a document, said network node being configured for managing said data in digital form.

25. The system of claim 24, wherein said digital form is a data sheet of a data management system.

26. The system of claim 22, wherein said message is an email message, said network node and said managing unit being connected to a computer communication network.

27. The system of claim 22, wherein said message is a cellular message, said network node and said managing unit being connected to a cellular communication network.

28. The system of claim 22, wherein said message is an instant messaging (IM) message, said network node and said managing unit being connected to a computer network.

29. A system for managing encryption of digital content, comprising:
a managing unit configured managing a plurality of cryptographic keys each associated with a group of users; and
a plurality of cryptographic modules installed in a plurality of client terminals linked to a computer network, and configured for allowing a first member of said group to encrypt at least one first textual string using a respective said cryptographic key and add an identifier to said at least one encrypted textual string while maintaining at least one second textual string in an unencrypted state, said identifier used for identifying said at least one encrypted first textual string for decryption of said at least one first encrypted textual string, and uploading said at least one encrypted first textual string and said added identifier therefore to a remote network node, over said computer network, wherein said remote network node places content in a document comprising said at least one unencrypted second textual string by filling in at least one field of said document with said at least one encrypted first textual string and said added identifier;
wherein at least one of said plurality of cryptographic modules is configured for allowing a second member of said group to decrypt said at least one uploaded encrypted first textual string using said respective cryptographic key and based on said identifier, said remote network node being configured for storing and retrieving said at least one encrypted first textual string with said identifier without decrypting said at least one first encrypted textual string while maintaining said at least one second textual string in said unencrypted text.

30. A network server configured for encrypting data, comprising:
  a port configured for receiving at least one textual string from an application accessed using a client terminal, via a computer network, said at least one first textual string being designated for filling at least one field in a document including at least one unencrypted second textual string managed by a network node;
  an encrypting module configured for encrypting said at least one first textual string and adding an identifier to said at least one encrypted textual string and maintaining said at least one unencrypted second textual string in an unencrypted state, said identifier used for identifying said at least one encrypted first textual string for decryption of said at least one encrypted first textual string by an entity separate from said network node, said entity for retrieving said at least one encrypted textual first string and said at least one unencrypted second textual string in said unencrypted state; and
  an output module configured for sending said at least one first encrypted textual string and said added identifier to said network node via said computer network so as to place said content in said document by said network node filling in said at least one field of said document with said at least one encrypted first textual string and maintaining said at least one unencrypted second textual string in said unencrypted state.

31. The network server of claim 30 further comprising a searching module for receiving and processing a search query, said processed search query being used for searching said network node for at least one character in said at least one encrypted textual string.

32. The network server of claim 31 wherein said searching is performed without decrypting said at least one encrypted textual string and said added identifier.

33. A client terminal configured for encrypting data, comprising:
  a port configured for allowing an application to access, via a computer network, at least one field in a document managed by a network node, said document including at least one unencrypted first textual string;
  an input module configured for receiving, from a user, digital content including at least one second textual string for filling in said at least one field;
  an encrypting module configured for encrypting said at least one second textual string and maintaining said at least one unencrypted first textual string in an unencrypted state and adding an identifier to said at least one encrypted second textual string, said identifier used for identifying said at least one encrypted second textual string for decryption of said at least one encrypted second textual string by an entity separate from said network node, said entity for retrieving said at least one second encrypted textual string; and
  an output module configured for sending said at least one encrypted second textual string and said added identifier to said network node via said computer network, wherein said network node places said content in said document comprising said at least one unencrypted second textual string, by filling in of said at least one field in said document with said at least one encrypted second textual string.

34. The method of claim 1, wherein said identifier is concatenated to at least one end of said at least one encrypted textual string.

35. The method of claim 1, wherein said identifier is associated with and remains separate from said at least one encrypted textual string.

36. The method of claim 1, wherein said processing includes decryption.

37. The method of claim 1, wherein said processing includes decryption.

38. The network server of claim 30, additionally comprising a decryption module for said processing said at least one encrypted textual string to which said identifier has been added by decrypting said at least one encrypted textual string based on said added identifier.

39. The client terminal of claim 33, additionally comprising a decryption module for processing said at least one encrypted textual string to which said identifier has been added by decrypting said at least one encrypted textual string based on said added identifier.

40. A method for encrypting data, comprising:
  a) receiving input, from a user, via a client terminal, digital content including at least one first textual string for filling in at least one field in a document managed by a network node via—said computer network, wherein said document includes at least one unencrypted second textual string;
  b) encrypting said at least one first textual string to ciphertext and maintaining said at least one unencrypted second textual string in an unencrypted state;
  c) adding an identifier to said ciphertext, said identifier used for identifying said ciphertext for decryption of said ciphertext of said at least one first textual string by an entity separate from said network node, said entity for retrieving said at least one encrypted first textual string;
  d) sending said ciphertext and said added identifier, to said network node via said computer network; and
  e) placing said content in said document, by said network node, by filling in said at least one field of said document with said ciphertext and said added identifier and maintaining said at least one unencrypted second textual string in said unencrypted state;
  wherein said network node stores and retrieves said ciphertext and said added identifier in said at least one field of said document including said at least one unencrypted second textual string.

41. The method of claim 40, additionally comprising:
  decrypting said ciphertext based on said added identifier.

42. The method of claim 1, wherein said entity for retrieving said at least one encrypted textual string retrieves said at least one encrypted textual string via said computer network.

* * * * *